(12) United States Patent
Chua et al.

(10) Patent No.: US 9,276,877 B1
(45) Date of Patent: Mar. 1, 2016

(54) DATA MODEL FOR SOFTWARE DEFINED NETWORKS

(71) Applicant: Wiretap Ventures, LLC, Santa Clara, CA (US)

(72) Inventors: Roy Liang Chua, Saratoga, CA (US); Matthew Palmer, Menlo Park, CA (US); Andrew Keith Pearce, San Francisco, CA (US); David Warren Hawley, Belmont, CA (US)

(73) Assignee: Wiretap Ventures, LLC, Santa Clara, CA (US)

( * ) Notice: Subject to any disclaimer, the term of this patent is extended or adjusted under 35 U.S.C. 154(b) by 75 days.

(21) Appl. No.: 13/842,067

(22) Filed: Mar. 15, 2013

Related U.S. Application Data

(60) Provisional application No. 61/703,692, filed on Sep. 20, 2012.

(51) Int. Cl.
*H04L 12/751* (2013.01)
*H04L 12/933* (2013.01)

(52) U.S. Cl.
CPC ............... *H04L 49/15* (2013.01); *H04L 45/02* (2013.01)

(58) Field of Classification Search
USPC ..................... 370/254; 709/223, 227; 726/22
See application file for complete search history.

(56) References Cited

U.S. PATENT DOCUMENTS

| | | |
|---|---|---|
| 6,954,775 B1 | 10/2005 | Shanklin et al. |
| 7,024,600 B2 | 4/2006 | Manley et al. |
| 7,342,890 B1 | 3/2008 | Ferguson |
| 7,519,294 B2 | 4/2009 | Bullock |
| 7,607,049 B2 | 10/2009 | Yasuie et al. |
| 7,796,601 B1 | 9/2010 | Norman |
| 7,801,031 B2 | 9/2010 | Chao |
| 7,813,263 B2 * | 10/2010 | Chang et al. ............ 370/216 |
| 7,969,862 B1 | 6/2011 | Wang |
| 8,369,213 B2 | 2/2013 | Vasseur |
| 8,396,950 B1 | 3/2013 | Sandick et al. |
| 8,619,546 B2 | 12/2013 | Nandagopal et al. |
| 8,755,389 B1 | 6/2014 | Poutievski et al. |

(Continued)

OTHER PUBLICATIONS

U.S. Appl. No. 13/841,968, by Matthew Palmer, filed Mar. 15, 2013.

(Continued)

*Primary Examiner* — Phuongchau Ba Nguyen
(74) *Attorney, Agent, or Firm* — Pillsbury Winthrop Shaw Pittman LLPSV

(57) ABSTRACT

In one example, a controller device for a software defined network (SDN) includes one or more network interfaces configured to communicate with network devices of the SDN, and one or more processors configured to obtain data representative of the network devices in the SDN, instantiate software-based controller objects for controllers of the network devices, instantiate software-based switch description objects for switches of the network devices, wherein the software-based switch description objects each comprise data representative of a respective primary controller corresponding to a controller of the one or more controllers, a respective switch identifier, a respective switch media access control (MAC) address, a respective Internet protocol (IP) address, and a respective array of port description objects for each physical port on the respective switch, and managing, via the network interfaces, at least some of the switches using the switch description objects and the controller objects.

20 Claims, 9 Drawing Sheets

(56) References Cited

U.S. PATENT DOCUMENTS

| | | | |
|---|---|---|---|
| 8,755,893 | B2 | 6/2014 | Gross |
| 8,811,212 | B2 | 8/2014 | Beheshti-Zavareh et al. |
| 9,001,667 | B1 | 4/2015 | Khanna |
| 9,104,543 | B1 | 8/2015 | Cavanagh |
| 9,203,755 | B1 | 12/2015 | Wong |
| 2001/0045914 | A1 | 11/2001 | Bunker |
| 2002/0152320 | A1 | 10/2002 | Lau |
| 2004/0039827 | A1* | 2/2004 | Thomas et al. ............... 709/228 |
| 2005/0138111 | A1 | 6/2005 | Aton et al. |
| 2005/0265228 | A1 | 12/2005 | Fredette |
| 2006/0092857 | A1* | 5/2006 | Ansari et al. ................. 370/254 |
| 2007/0005740 | A1 | 1/2007 | DiFalco et al. |
| 2007/0088845 | A1 | 4/2007 | Memon et al. |
| 2007/0115967 | A1 | 5/2007 | Vandenberghe |
| 2007/0220175 | A1 | 9/2007 | Khanna |
| 2008/0062871 | A1 | 3/2008 | Grayson |
| 2008/0219156 | A1 | 9/2008 | Caviglia |
| 2008/0232347 | A1 | 9/2008 | Chao et al. |
| 2009/0201803 | A1 | 8/2009 | Filsfils |
| 2009/0249115 | A1 | 10/2009 | Bycroft |
| 2010/0054122 | A1 | 3/2010 | Taylor |
| 2010/0266279 | A1 | 10/2010 | Sadananda |
| 2010/0293043 | A1 | 11/2010 | Atreya |
| 2011/0196953 | A1 | 8/2011 | Samaha |
| 2011/0264795 | A1 | 10/2011 | Koide et al. |
| 2011/0286324 | A1* | 11/2011 | Bellagamba et al. ......... 370/219 |
| 2012/0044801 | A1 | 2/2012 | Vasseur |
| 2012/0176890 | A1 | 7/2012 | Balus et al. |
| 2012/0195186 | A1 | 8/2012 | Singh |
| 2012/0227091 | A1 | 9/2012 | Smith |
| 2012/0287791 | A1 | 11/2012 | Xi et al. |
| 2013/0010600 | A1 | 1/2013 | Jocha et al. |
| 2013/0028070 | A1 | 1/2013 | Beheshti-Zavareh |
| 2013/0028073 | A1 | 1/2013 | Tatipamula |
| 2013/0044636 | A1 | 2/2013 | Koponen |
| 2013/0058208 | A1 | 3/2013 | Pfaff et al. |
| 2013/0163475 | A1* | 6/2013 | Beliveau et al. .............. 370/257 |
| 2013/0173810 | A1* | 7/2013 | Subramaniam ............... 709/227 |
| 2013/0223442 | A1* | 8/2013 | Narayanan et al. ........... 370/389 |
| 2013/0275552 | A1 | 10/2013 | Dhesikan et al. |
| 2013/0283374 | A1* | 10/2013 | Zisapel et al. .................. 726/22 |
| 2013/0286893 | A1 | 10/2013 | Zhu |
| 2013/0329601 | A1* | 12/2013 | Yin et al. ...................... 370/254 |
| 2013/0332982 | A1 | 12/2013 | Rao et al. |
| 2013/0333029 | A1* | 12/2013 | Chesla et al. ................... 726/22 |
| 2014/0003232 | A1 | 1/2014 | Guichard et al. |
| 2014/0020072 | A1 | 1/2014 | Thomas |
| 2014/0052830 | A1 | 2/2014 | Bigall |
| 2014/0052836 | A1 | 2/2014 | Nguyen et al. |
| 2014/0169158 | A1 | 6/2014 | Mishra |
| 2014/0195666 | A1 | 7/2014 | Dumitriu et al. |
| 2015/0023210 | A1 | 1/2015 | Kis |
| 2015/0341257 | A1 | 11/2015 | Jiang |

OTHER PUBLICATIONS

U.S. Appl. No. 13/842,064, by Matthew Palmer, filed Mar. 15, 2013.
U.S. Appl. No. 13/842,192, by Matthew Palmer, filed Mar. 15, 2013.
U.S. Appl. No. 13/842,186, by Matthew Palmer, filed Mar. 15, 2013.
U.S. Appl. No. 13/842,264, by Matthew Palmer, filed Mar. 15, 2013.
McKeown et al., "OpenFlow: Enabling Innovation in Campus Networks," Computer Communication Review, ACM SIGCOMM, vol. 38(2), Apr. 2008, 6 pp.
U.S. Appl. No. 61/625,872, by Yehuda Zisapel, filed Apr. 18, 2012.

* cited by examiner

DATA MODEL FOR SOFTWARE DEFINED NETWORKS

This application claims the benefit of U.S. Provisional Application No. 61/703,692, filed Sep. 20, 2012, the entire contents of which are hereby incorporated by reference.

TECHNICAL FIELD

This disclosure relates to computer networks and, in particular, software defined networks.

BACKGROUND

Computer networks are formed by a collection of devices operating according to a set of various protocols. Typical computer networks are formed by routers that each executes routing protocols to discover routes between various endpoints, and switches that execute switching protocols, such as the spanning tree protocol (STP). In accordance with the routing protocols, routers exchange information regarding routes discovered by the routers. In this manner, each router typically performs its own determination as to the best routes to use to cause traffic to traverse the network.

Recently, software defined networks have been developed as a way to deploy and operate networks and develop new networking applications. In general, software defined networks involve the use of a standalone controller that performs the control functionality for a set of network devices. As an example of software defined networking, in the case of routing, rather than routers performing individual analyses to determine routes through the network, the controller can determine the routes and program other devices in the network to behave according to the determinations made by the controller. Different protocols may be used to implement software defined networking, including open protocols like OpenFlow, and proprietary protocols from network vendors. OpenFlow is described in McKeown et al., "OpenFlow: Enabling Innovation in Campus Networks," http://www.openflow.org//documents/openflow-wp-latest.pdf, which is hereby incorporated by reference in its entirety.

SUMMARY

In general, this disclosure describes techniques related to controlling software defined networks (SDNs). A software defined network is generally a network of interconnected computing devices having forwarding planes or data planes that can be programmed remotely by one or more controller devices. In this manner, the control plane can be physically separate from the data plane (or forwarding plane) for an SDN. These computing devices can have either physical instantiation or virtual (software-only) instantiation without the presence of a hardware appliance. This disclosure describes various techniques related to controlling SDNs.

In one example, a method includes determining, by a controller device for a software defined network, connections between network devices in the software defined network, determining, by the controller device, one or more paths for network traffic between the network devices based on the determination of the connections, and programming, by the controller device, the network devices to direct network traffic along the one or more paths.

In another example, a controller device for a software defined network includes one or more interfaces for communicating with network devices in the software defined network, and one or more processors configured to determine connections between the network devices, determine one or more paths for network traffic between the network devices based on the determination of the connections, and program the network devices to direct network traffic along the one or more paths.

In another example, a computer-readable storage medium has stored thereon instructions that, when executed, cause a processor of a controller device for a software defined network to determine connections between network devices in the software defined network, determine one or more paths for network traffic between the network devices based on the determination of the connections, and program the network devices to direct network traffic along the one or more paths.

In another example, a method includes programming, by a controller device for a software defined network (SDN), a first network device of the SDN to send packets of a packet flow to a service device, and programming, by the controller device, one or more network devices of the SDN to perform a programmed action on packets of the packet flow based on data received from the service device for the packet flow.

In another example, a controller device for a software defined network (SDN) includes one or more network interfaces configured to communicate with network devices of the SDN, and one or more processors configured to program a first network device of the SDN to send packets of a packet flow to a service device, and program one or more network devices of the SDN to perform a programmed action on packets of the packet flow based on data received from the service device for the packet flow.

In another example, a computer-readable storage medium has stored thereon instructions that, when executed, cause a processor of a controller device for a software defined network (SDN) to program a first network device of the SDN to send packets of a packet flow to a service device, and program one or more network devices of the SDN to perform a programmed action on packets of the packet flow based on data received from the service device for the packet flow.

In another example, a method includes programming, by a controller device for a software defined network (SDN), a set of network devices of the SDN to form a path through the SDN and to send data representative of packets sent along the path to the controller device, sending, by the controller device, packets of a packet flow corresponding to the path to one of the set of network devices, determining, by the controller device, whether the set of network devices is properly forwarding the packets of the packet flow along the path based on data received from the set of network devices, and presenting a report representative of the determination.

In another example, a controller device for a software defined network (SDN) includes one or more network interfaces configured to communicate with network devices of the SDN, and one or more processors configured to program a set of network devices of the SDN to form a path through the SDN and to send data representative of packets sent along the path to the controller device, send, via one of the network interfaces, packets of a packet flow corresponding to the path to one of the set of network devices, determine whether the set of network devices is properly forwarding the packets of the packet flow along the path based on data received from the set of network devices, and present a report representative of the determination.

In another example, a computer-readable storage medium has stored thereon instructions that, when executed, cause a processor of a controller device for a software defined network (SDN) to program a set of network devices of the SDN to form a path through the SDN and to send data representative of packets sent along the path to the controller device, send packets of a packet flow corresponding to the path to one of the set of network devices, determine whether the set of network devices is properly forwarding the packets of the packet flow along the path based on data received from the set of network devices, and present a report representative of the determination.

In another example, a method includes determining, by a controller device for a software defined network (SDN), a primary path for network traffic between network devices of the SDN, determining, by the controller device, a backup path to the primary path for the network traffic between the network devices of the SDN, and, in response to a failover event, configuring the network devices to switch from the primary path to the backup path.

In another example, a controller device for a software defined network (SDN) includes one or more network interfaces configured to communicate with network devices of the SDN, and one or more processors configured to determine a primary path for network traffic between network devices of the SDN, determine a backup path to the primary path for the network traffic between the network devices of the SDN, and, in response to a failover event, configure the network devices to switch from the primary path to the backup path.

In another example, a computer-readable storage medium has stored thereon instructions that, when executed, cause a processor of a controller device for a software defined network (SDN) to determine a primary path for network traffic between network devices of the SDN, determine a backup path to the primary path for the network traffic between the network devices of the SDN, and, in response to a failover event, configure the network devices to switch from the primary path to the backup path.

In another example, a method includes obtaining, by a controller device of a software defined network (SDN), data representative of physical network devices in the SDN, wherein the physical network devices comprise one or more switches and one or more controllers including the controller device, instantiating, by the controller device, software-based controller objects for each of the one or more controllers, wherein the software-based controller objects each comprise data representative of a respective instance name, a respective server hostname, and a respective server host port, instantiating, by the controller device, software-based switch description objects for each of the one or more switches, wherein the software-based switch description objects each comprise data representative of a respective primary controller corresponding to a controller of the one or more controllers, a respective switch identifier, a respective switch media access control (MAC) address, a respective Internet protocol (IP) address, and a respective array of port description objects for each physical port on the respective switch, and managing, by the controller device, at least some of the switches using the switch description objects and the controller objects.

In another example, a controller device for a software defined network (SDN) includes one or more network interfaces configured to communicate with network devices of the SDN, and one or more processors configured to obtain data representative of physical network devices in the SDN, wherein the physical network devices comprise one or more switches and one or more controllers including the controller device, instantiate software-based controller objects for each of the one or more controllers, wherein the software-based controller objects each comprise data representative of a respective instance name, a respective server hostname, and a respective server host port, instantiate software-based switch description objects for each of the one or more switches, wherein the software-based switch description objects each comprise data representative of a respective primary controller corresponding to a controller of the one or more controllers, a respective switch identifier, a respective switch media access control (MAC) address, a respective Internet protocol (IP) address, and a respective array of port description objects for each physical port on the respective switch, and managing, via the network interfaces, at least some of the switches using the switch description objects and the controller objects.

In another example, a computer-readable storage medium has stored thereon instructions that, when executed, cause a processor of a controller device for a software defined network (SDN) to obtain data representative of physical network devices in the SDN, wherein the physical network devices comprise one or more switches and one or more controllers including the controller device, instantiate software-based controller objects for each of the one or more controllers, wherein the software-based controller objects each comprise data representative of a respective instance name, a respective server hostname, and a respective server host port, instantiate software-based switch description objects for each of the one or more switches, wherein the software-based switch description objects each comprise data representative of a respective primary controller corresponding to a controller of the one or more controllers, a respective switch identifier, a respective switch media access control (MAC) address, a respective Internet protocol (IP) address, and a respective array of port description objects for each physical port on the respective switch, and manage at least some of the switches using the switch description objects and the controller objects.

In another example, a method includes receiving, by a controller device for a software defined network (SDN), credentials from a client device in accordance with a public key infrastructure (PKI)-based authentication protocol, determining, by the controller device, one or more policies that are applicable to the client device based on the received credentials, and programming, by the controller device, network devices of the SDN to enforce the determined policies on a per-packet-flow basis for packet flows including the client device.

In another example, a controller device for a software defined network (SDN) includes one or more network interfaces configured to communicate with network devices of the SDN, and one or more processors configured to receive credentials from a client device in accordance with a public key infrastructure (PKI)-based authentication protocol, determine one or more policies that are applicable to the client device based on the received credentials, and program network devices of the SDN to enforce the determined policies on a per-packet-flow basis for packet flows including the client device.

In another example, a computer-readable storage medium has stored thereon instructions that, when executed, cause a processor of a controller device for a software defined network (SDN) to receive credentials from a client device in accordance with a public key infrastructure (PKI)-based authentication protocol, determine one or more policies that are applicable to the client device based on the received credentials, and program network devices of the SDN to enforce the determined policies on a per-packet-flow basis for packet flows including the client device.

The details of one or more examples are set forth in the accompanying drawings and the description below. Other features, objects, and advantages will be apparent from the description and drawings, and from the claims.

DETAILED DESCRIPTION

Figure 1:
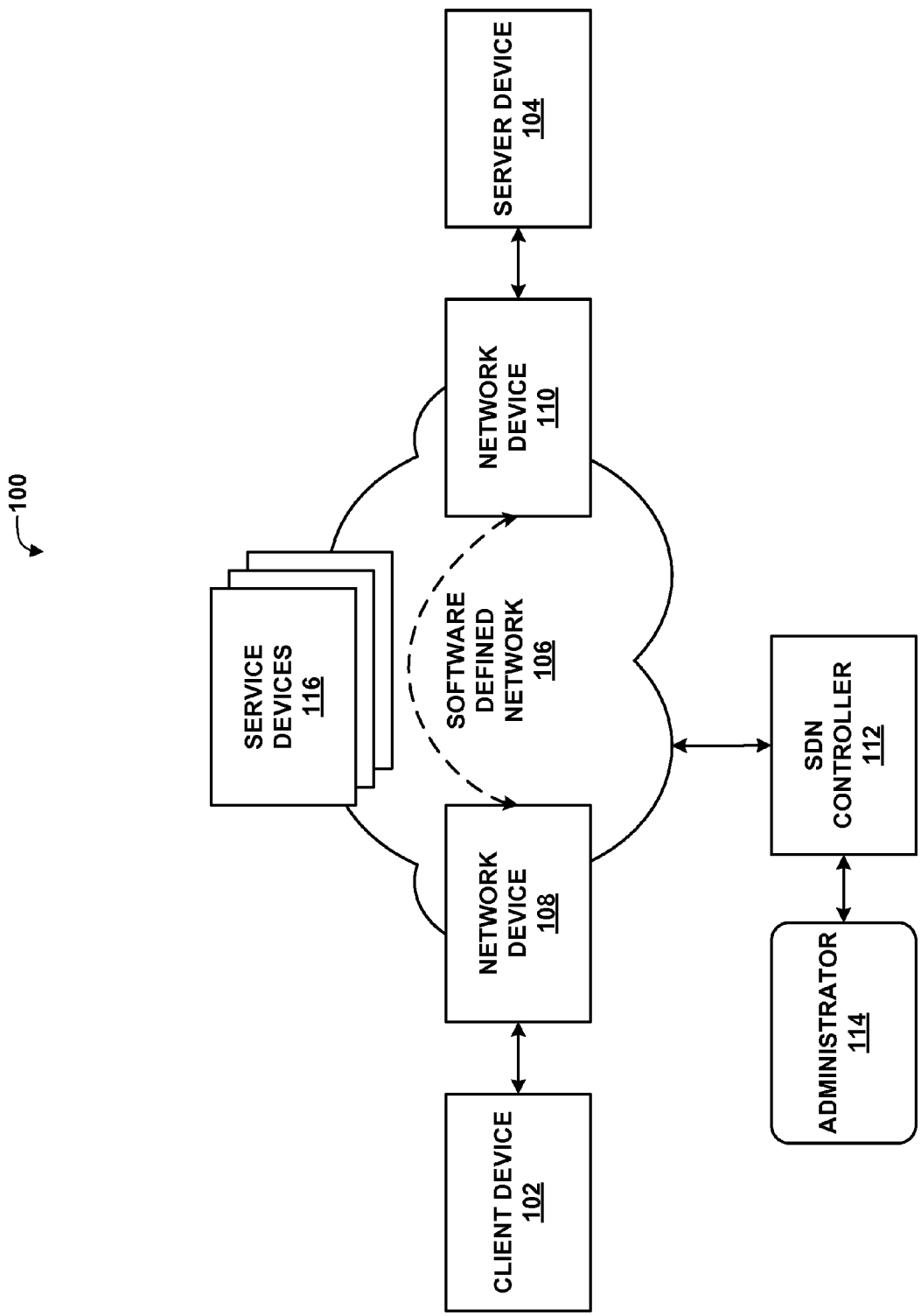
FIG. 1 is a block diagram illustrating an example system in which various techniques of this disclosure may be used.

FIG. 1 is a block diagram illustrating an example system 100 in which various techniques of this disclosure may be used. In this example, system 100 includes software defined network (SDN) 106, which includes network devices 108, 110 and service devices 116. Network devices 108, 110 may comprise switches, and other devices (not shown). These network devices can be physical instantiations or virtual instantiations. SDN 106 may also include other types of devices, such as routers, load balancers, various L4-L7 network devices, or even multi-tenant capable devices, among other network devices. Again, these network devices can be either of physical or virtual instantiations. In general, network devices of SDN 106, such as network devices 108,110, can be programmed to forward network traffic. System 100 also includes software defined network (SDN) controller 112. Administrator 114 uses SDN controller 112 to control (that is, program) network devices of SDN 106, such as network devices 108, 110.

SDN 106 generally serves to interconnect various endpoint devices, such as client device 102 and server device 104. In addition, SDN 106 may provide services to network traffic flowing between client device 102 and server device 104. Alternatively, SDN 106 may provide services to client device 102, without further directing traffic to server device 106. For example, administrator 114 may use SDN controller 112 to program network devices of SDN 106 to direct network traffic for client device 102 to one or more of service devices 116. Service devices 116 may include, for example, intrusion detection service (IDS) devices, intrusion prevention system (IPS) devices, web proxies, web servers, web-application firewalls and the like. In other examples, service devices 116 may, additionally or alternatively, include devices for providing services such as, for example, denial of service (DoS) protection, distributed denial of service (DDoS) protection, traffic filtering, wide area network (WAN) acceleration, or other such services. Service devices 116 may also additionally or alternatively include malware detection devices, network anti-virus devices, network packet capture and analysis devices, honeypot devices, reflector net devices, tar pit devices, domain name service (DNS) and global DNS server devices, mail proxies, and anti-spam devices.

Service devices 116 may, additionally or alternatively, include devices in various device categories such as, for example, network and application security devices, application optimization devices, scaling devices, traffic shaping devices, and/or monitoring and analytics devices. Moreover, although shown as individual devices, it should be understood that service devices may be realized by physical devices, multi-tenant devices, or using virtual services (e.g., cloud-based services). Moreover, service devices 116 may represent multi-function devices. For purposes of example and ease of explanation, this disclosure primarily describes individual service devices. However, it should be understood that the techniques of this disclosure may be readily applied to virtual devices and cloud-based applications, in addition or in the alternative to physical devices. Likewise, where this disclosure refers to a switch or other network device, it should be understood that these techniques may apply to virtual switches or other virtual network devices.

SDN controller 112 may implement any or all of the techniques described in this disclosure for controlling various devices of SDN 106, such as network devices 108, 110, and service devices 116. These techniques are described in greater detail below. Examples of the techniques described below include a data model for managing devices of an SDN, implementing high availability among devices of an SDN, performing services for packets flowing along a path through an SDN, trigger-driven policy distribution, and using test traffic to verify whether devices of the SDN are operating correctly.

Users of SDN controller 112 may be provided with the ability to create programs that are executable by SDN controller 112. For example, a software development kit (SDK) may be provided for creating programs that can be executed by SDN controller 112. In this manner, users or other third parties may utilize an environment to write applications that can be executed by SDN controller 112. For example, SDN controller 112 itself may host one or more L4-L7 services, rather than (or in addition to) services provided by service devices 116. As another example, a L3 application (such as Quagga, a Layer 3 routing stack) may be executed by SDN controller 112. In this case, the Quagga routing stack would be running a standard routing protocol such as OSPF (Open Shortest Path Forwarding) or BGP (Border Gateway Protocol) and would update its routing tables like before, except that it would use the SDN controller 112 to command the network equipment to update their forwarding tables.

SDN controller 112 may be configured to logically represent an existing physical or virtual topology within a de-militarized zone (DMZ) in an organizational network, such that the logical topology can be manipulated with corresponding physical impact on flows. SDN controller 112 may also be used in combination with a switching platform into which existing physical devices are plugged, and a software control platform that is able to virtually map and control the logical flows running through the switch. The switching platform may be powered by ASICs (application specific integrated circuits) and provide flow control capabilities as exposed by proprietary vendor-specific APIs or open standards such as OpenFlow. Alternatively, the switching platform may be based on software, while providing requisite hardware for executing the software (e.g., computer-readable media for storing instructions and one or more processing units for executing the instructions).

Devices that may be plugged into (that is, communicatively coupled to) SDN controller 112 (also sometimes referred to as a "FlowDirector") generally include classes of devices found in most network-based DMZs, including firewalls, web proxies, mail proxies, AV (anti-virus) proxies, mail systems, IDS (intrusion detection systems), IPS (intrusion prevention systems), VPN (virtual private network) servers, web application firewalls, vulnerability scanners, network recording and analysis systems, and packet shapers. Most of these devices are either security devices, or traffic engineering or visibility devices, in some examples.

SDN controller 112 may overcome certain problems encountered by devices of network-based DMZs. For example, such conventional DMZs may suffer from a lack of visibility. That is, without physically tracing wire connections and where each connection ends up, it can be difficult to determine which devices are connected in conventional DMZs, and even more difficult to determine the type of traffic that is flowing through the conventional DMZs end to end (that is, from the ingress Internet connection to the internal organizational network or application clusters in the datacenter). Moreover, conventional DMZs can be difficult to manage, in that reconfiguration of a conventional DMZ network often requires manual reconnections of cables, which is an expensive and error-prone activity.

SDN controller 112 may receive data as input from service devices 116. For example, SDN controller 112 may be configured to receive data from an intrusion detection system (IDS) device, a Denial of Service (DoS) device, a Distributed Denial of Service (DDoS) device, an intrusion prevention system (IPS) device, or the like. Based on this information, SDN controller 112 may make network enforcement decisions for specific traffic flows. That is, SDN controller 112 may program network devices of SDN 106 to perform programmed actions on packets of a packet flow based on this data. Such programmed actions may include:

Allow—explicitly allow a certain network flow to proceed to its destination

Block—explicitly block a certain flow from traversing SDN 106

Mirror—allow the traffic, but send a copy of the traffic for deeper inspection or recording to, e.g., one of service devices 116

Redirect—redirect the traffic to another network device (such as a honeypot device or other device of service devices 116) for either inspection or to keep a potential hacker 'busy' to determine if there is a real security threat.

Transform—modify or translate values of headers of packets in the network flow

Encapsulate—encapsulate packets in the network flow with a particular header

SDN controller 112 may also log the programmed actions and information used to make the enforcement decisions, present the information to administrator 114 (or other user), and/or export data representative of the logs or results to a third party application, which may or may not include the application that sent an event that triggered SDN controller 112 to enforce a new policy.

Moreover, SDN controller 112 may direct traffic of distinct packet flows through a common security device, e.g., one of service devices 116. For example, SDN controller 112 may direct network traffic of various paths (that is, paths that end at distinct destinations) such that the paths flow through a common security device, e.g., an IDS device, a firewall, or the like. The paths may be determined on a per-packet basis or on a per-packet-flow basis, in various examples.

SDN controller 112 may also be configured to track changes related to rules provided for modifying paths through SDN 106. As an example, SDN controller 112 may track identifying information for a user who added, modified, or removed a rule. SDN controller 112 may store, track, and report such information for any or all rules used by SDN controller 112. In this manner, for any or all rules of SDN controller 112, information may be available regarding who made the rule, where the rule was made as part of Rule Flows, how SDN controller 112 received the rule (e.g., via an application programming interface (API), a graphical user interface (GUI), or other interface), when the rule was added or removed, and any notes indicating reasons for the change, addition, or removal to the rule.

In some examples, SDN controller 112 may interact with an authentication, authorization, and accounting (AAA) server or AAA infrastructure to track changes to the rules. The AAA server or AAA infrastructure may implement, for example, Remote Authentication Dial In User Service (RADIUS), Diameter, Lightweight Directory Access Protocol (LDAP), or the like. Likewise, SDN controller 112 may implement a AAA client. The AAA server or AAA framework may include configuration data that specifies entitlement information, e.g., using user attributes or group attributes, that specifies privileges for a user or a group to which the user belongs. Such privileges may include, for example, any or all of the ability to view, add, modify, or delete rules. Such capabilities may be extended to certain applications as well (e.g., using private key infrastructure (PKI) techniques to identify the various applications), and/or otherwise used when other systems attempt to access SDN controller 112 or other devices of SDN 106.

In addition to the problems associated with conventional DMZs discussed above, conventional DMZs are not able to dynamically receive external inputs to automatically re-configure the DMZ to increase the security profile of the network, or to enforce new rules that protect the network from next-generation security threats. Accordingly, traffic that is not supposed to traverse the network may enter the network, which may result in network outage, data loss, IP loss, or other disruptions. SDN controller 112 may overcome these problems by accepting external triggers or events to automatically update security policies on the DMZ (or internal security zone) to block traffic that is not supposed to traverse a specific DMZ or security zone. SDN controller 112 may then push this information down to programmable flow devices (e.g., Ethernet switches of SDN 106). SDN controller 112 may be designed to make low cost Ethernet switches into highly controlled and coordinated security appliances.

SDN controller 112 may also provide a mechanism by which to troubleshoot applications and to both sniff traffic on certain ports as well as run tests through the devices in the DMZ to ensure that the traffic is flowing appropriately (e.g., to ensure that the devices are not malfunctioning). More particularly, SDN controller 112 may provide the ability to both inject test flows (automatically based on introspection on the device parameters and configuration) and observe test flows (by attaching a virtual probe) anywhere along a flowchain (that is, a network path through SDN 106) on SDN controller 112. When one of the devices does not indicate that it received data of a test flow in a timely manner, SDN controller 112 may determine that the one of the devices is malfunctioning, and SDN controller 112 may reprogram the devices to avoid the malfunctioning device. For example, SDN controller 112 may reprogram the devices to direct network traffic around a network device that is determined to be malfunctioning. In this manner, SDN controller 112 may provide various advantages, such as the ability to troubleshoot an existing live system without disrupting traffic and to determine what traffic is traversing a particular point in a flowchain.

SDN controller 112 may also configure network devices of SDN 106 to provide high availability. That is SDN controller 112 may configure two or more devices as a high availability pair, such that one device is a primary device, and another device is a backup device to the primary device, for a particular path or packet flow. In this manner, failover can occur from the primary device to the backup device. SDN controller 112 may overcome issues related to high availability or resiliency that arise from brittle, manually managed configurations of conventional DMZ networks. SDN controller 112 allows dynamic reconfiguration of a DMZ network for SDN 106 based on failures or other dynamic network events. This allows administrator 114 to pre-determine the response of the DMZ network on a per-flow basis.

In the example of FIG. 1, SDN controller 112 controls network devices 108, 110 of SDN 106. However, it should be understood that SDN controller 112 may control any packet processing platform, such as a physical device, a virtual platform, a cloud based platform, or any other sort of packet processing platform.

SDN controller 112 may provide a platform that encompasses various capabilities for custom software-defined networking deployments. Such capabilities may include: a flexible network controller with the ability to communicate using standards-based or proprietary control protocols to control network flows on networking devices, both physical and virtual; a standards-based policy engine tied into the network controller logic; an extensible API for programmatic access from applications; and/or additional networking services that can execute on SDN controller 112.

Development of the techniques of this disclosure has uncovered a business need to solve network access control and privileges problems on wired, wireless, and/or remote access networks, as networks become flatter (e.g., more operation at L2 of the OSI model with less operation at L3 of the OSI model). As the roles become more global and security needs become more stringent, the problems of network access control and privileges becomes more complex. In addition to the access control problem, there is also an increasing focus on the security service insertion problem—putting in appropriate security services based on user identity and the user's role in the organization (e.g., for compliance and regulations, which may be country-based).

Prior to the development of the techniques of this disclosure, existing access control solutions for networks were limited to coarse grained controls such as VLANs and were limited due to the nature of limited number of VLANs. Creating per-user VLANs is not necessarily appropriate, due to the complexity of management. SSL-VPN or IPsec VPN solutions that require users to tunnel back to a central control point (sometimes back in a different country) can be complex and inefficient, and can ignore the local network constraints or settings. Although OpenFlow and other software-defined networking technologies can be applied to the problem using fine-grained flow controls, the policy and identity infrastructure were not sufficiently mature.

Thus, this disclosure also describes certain techniques that may be used to overcome the above noted problems relating to access control in a software defined network. In accordance with these techniques, a platform (such as SDN controller 112) may have network flow control capabilities on one end (e.g., via the OpenFlow (or other) protocol, interacting with both physical and virtual network access devices (switches for instance)), and a policy and identity stack on the other end.

To identify a user and device prior to applying the appropriate policy, standards-based techniques can be used. Traditionally, switches have provided MAC address authentication, using 802.1X based authentication and port-based controls, as well as Web-Authentication. In an OpenFlow or SDN network, these stacks are not necessarily available on the network access device. Therefore, in accordance with these techniques, these stacks may be moved onto a central application/control platform, so that the authentication function can be appropriately performed on the central platform. The central platform may be a controller, such as SDN controller 112, or simply an application that has a southbound OpenFlow or other SDN interface.

Using the OpenFlow or other SDN protocol, it is possible to set up the recognition of Extensible Authentication Protocol (EAP) over Local Area Network (EAPOL) packets (transport mechanism for 802.1X protocol) and to create a conversation with the control platform to emulate an 802.1X exchange. In this manner, system 100 can perform authentication via EAP methods (using certificates or passwords) to identify the end-point (e.g., user and client device, e.g., client device 102). Unlike 802.1X port-based security, however, the use of 802.1X in an SDN framework can be used to lock down specific MAC source addresses, and can apply per-flow (that is, per-packet-flow) admission controls, as well as per-flow service orchestration and insertion to scan the traffic for malicious or sensitive content, as dictated by a policy engine.

In this framework, multiple EAP and 802.1X sessions can be constructed with different MAC addresses and very fine-grained flow rules be applied. This framework can also be used for MAC-authentication situations, where the end-points are not configured to utilize 802.1X, as well as for web-based authentication via a captive portal mechanism tied to the central control platform.

These techniques may further be extended, e.g., by causing the central control platform to perform the role of a RADIUS server to terminate the entire 802.1X conversation, removing the need for an additional external component and reducing the overall complexity and latency of the 802.1X conversation. In this manner, the central control platform can perform all of the necessary policy evaluations based on user identity and other context to determine the nature of access that should be granted, as well as the orchestration of necessary services to filter or scan each and every flow.

As another possible extension, the central control platform can also capture and inspect the first or a fixed number of packets to perform deep packet inspection for application classification to extend the policy enforcement to specific application types.

As yet another possible extension, the central control platform for mobile devices can look up user and/or device location information via various device location services, such as source IP address, GPS information, DNS, or other location based services, to extend the policy enforcement to specific locations. The central controller could also use time, day, and/or date as an element in decision making Thus, a central policy server controller may apply fine grained policies based on user, device, application, time, and/or location information, and apply these policies on L2 network devices, such as switches (e.g., network device 108 and network device 110).

Figure 2:
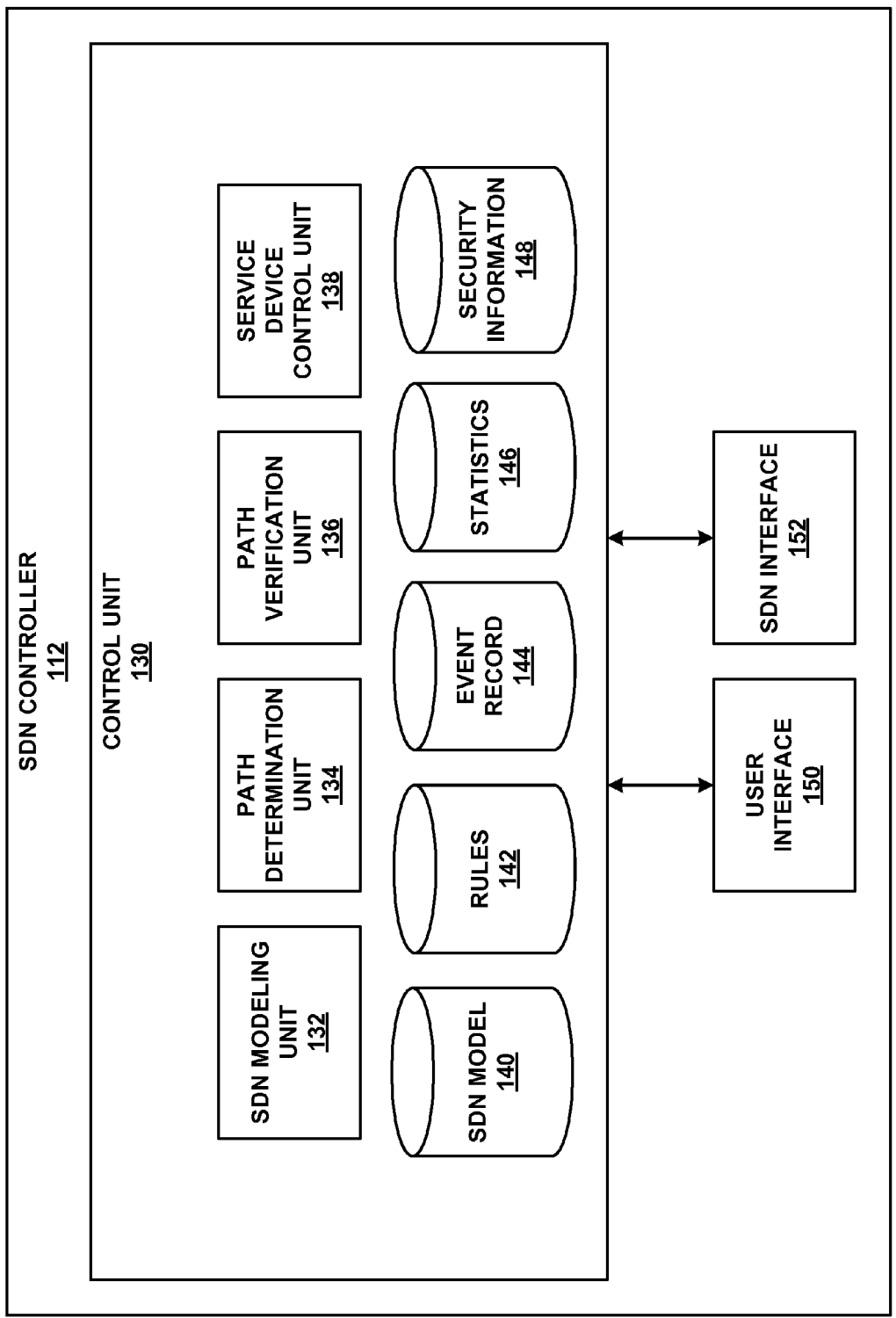
FIG. 2 is a block diagram illustrating an example set of components of a software defined network (SDN) controller.

FIG. 2 is a block diagram illustrating an example implementation of SDN controller 112 of FIG. 1. In this example, SDN controller 112 includes control unit 130, user interface 150, and SDN interface 152. Control unit 130 represents hardware, software, and/or firmware for performing the functions attributed to control unit 130. When implemented in software or firmware, it is presumed that control unit 130 further includes requisite hardware, such as one or more processors and/or computer readable memory for storing software or firmware instructions.

In this example, control unit 130 includes SDN modeling unit 132, path determination unit 134, path verification unit 136, service device control unit 138, SDN model 140, rules 142, event record 144, statistics 146, and security information 148.

SDN modeling unit 132 receives data representative of physical network devices in SDN 106, such as network device 108, network device 110, and service devices 116 (FIG. 1). SDN modeling unit 132 may also receive data representative of controller devices, including SDN controller 112, that control devices of SDN 106. SDN modeling unit 132 forms SDN model 140, which includes data that represents the physical devices of SDN 106. SDN model 140 may include software-based objects (that is, data for software objects conforming to the object oriented programming (OOP) paradigm) that represent the physical devices in a physical view, as well as a logical view of SDN 106. As noted above, the physical view includes devices such as controllers, switches, and devices connected to the switches (e.g., service devices 116) managed by controllers such as SDN controller 112.

The example data model described in this disclosure defines a low-level protocol abstraction layer and a high-level application data model that is suitable for building user interfaces and server-side functionality for management of network infrastructure. In this manner, the data model may be flexible and suitable for building user-facing products that use Software Defined Networking as a foundational technology for configuration and control of an underlying network infrastructure. SDN model 140 may include instantiations of software-based controller objects, one controller object for each physical controller device. Each controller object instance may include data for an identifier (e.g., an instance name), a server hostname, and a server host port that represents the corresponding controller device. The controller object may further define a set of switches that are permitted to connect to the corresponding controller device, to allow switch authentication. SDN model 140 may also include software-based switch entry objects for each switch of SDN 106, where each switch entry object may include data representative of the corresponding switch administration port media access control (MAC) address and a text description of the switch.

SDN model 140 may further include software-based switch description objects for the switches of SDN 106. Each switch description object represents a corresponding physical switch that is being managed by the system. Each switch object specifies the primary (and, if applicable, secondary) controllers the switch is connected to. The system supports redundant controller configurations, in which case both primary and secondary controllers may be specified for the switches. The switch description object may further include primary and secondary controller object links, text strings describing the switch name, switch MAC address, switch Internet protocol (IP) address, manufacture description, hardware description, software description, device serial number, and data path description. Fields may indicate the capabilities support by the switch, such as support for flow statistics, table statistics, group statistics, queue statistics, whether the switch supports IP fragment reassembly, whether the switch supports ARP matching, and the number of ports, tables and buffers available within the switch.

The switch description object may further include an array of software-based port description objects, one for each physical port on the switch. A port description object may include data representative of a port number, port name text string, MAC address, and fields that represent the capabilities of the switch port such as the port's media type (e.g., fiber or copper), port speed (e.g., 10 MB, 100 MB, 1 GB, 10 GB, 40 GB, 100 GB 1 TB) duplexicity (e.g., full duplex or half duplex), and auto-negotiation.

SDN model 140 may further include data representing a network topology for SDN 106. Rules 142 corresponds to data representing rules for generating flow rules. The network topology and rules of rules 142 may be defined by software-based objects, such as FlowChain objects, FlowLink objects, SubDevice objects, Device objects, DevicePort objects, PortRange objects, Source objects, Zone objects, SwitchPort objects, and Network objects. Modifier actions, that is, actions that modify the network, may also be modeled by software-based objects, such as push virtual local area network (VLAN) objects, pop VLAN objects, sniffer objects, splitter objects, set multiprotocol label switching (MPLS) label objects, push MPLS label, pop MPLS label, or other actions.

A FlowChain object may define the configuration data needed to configure and manage a set of flows (that is, packet flows) through the network infrastructure (e.g., through SDN 106). Each FlowChain object may include an identifier (e.g., a name), a Source object, one or more FlowLink objects, a flag to indicate whether the FlowChain is enabled or disabled, a flag to indicate whether the FlowChain is bi-directional, and a set of statistics for the FlowChain. The FlowChain may be defined using a set of configuration commands, e.g., extensible markup language (XML) commands, JavaScript Object Notation (JSON) commands, or other commands. In some examples, the commands may be natural language friendly. That is, the commands may be easily read and interpreted by a human operator. Such commands may benefit users in interacting with a device for creating a FlowChain, as well as other users, e.g., for audits and validation.

A FlowLink object may define the SubDevice associated with the FlowChain and an optional set of ModifierActions to be applied to traffic for this FlowChain.

A Device object may define a physical device that performs one or more capabilities for traffic flowing through the network. A Device object may include data representative of text strings that define an identifier for the device (e.g., the device name), device vendor, device model number, and name of an image file (e.g., a GIF, JPEG, TIFF, or PNG image file) associated with the device. The image file type is defined by a separate enumerated field within the object. The Device also includes links to one or more SubDevices associated with the physical device represented by this Device object.

A SubDevice object may define a subset of network device functionality for multi-function devices. The SubDevice object may comprise data representative of a text string containing an identifier for the SubDevice (e.g., the SubDevice's name), a link to the Device object associated with the SubDevice, the ingress and egress Switch identifier and Switch port number, ingress and egress VLAN tags, MPLS labels, flags that indicate whether the device is network address translation (NAT)-capable and port address translation (PAT)-capable, one or more Service object links, and/or a set of text strings that name the physical ports on the SubDevice.

A Service object may define a class of traffic that flows across the network. Each class of traffic can include data representative of an identifier (e.g., a text string that names the service), a protocol type enumeration (e.g., IP, ARP, etc.), and one or more IP port-based service entries that define the traffic controlled by the flow (e.g., POP3, HTTP, SMTP FTP etc.).

A PortRange object may define the traffic controlled by the flow (e.g., POP3, HTTP, SMTP, FTP, etc.). Each PortRange object may include data representative of an identifier (e.g., a text string description) and a range of IP ports defined by a start and end IP port number. Individual IP ports may be defined by setting the start and end IP ports to the same value.

A DevicePort object may be used to define the identifier (e.g., the name) of each physical port supported by a SubDevice.

A Source object may define the parameters needed to specify the network traffic source. Each Source object may include data representative of an identifier (e.g., a text string name) for the source, and a set of one or more zones. In particular, one or more flows may be grouped into zones. The zones may represent administrative or security areas that ensure that network managers or customers cannot interfere with each other from a switch control or data plane perspective. For example, a test or research SDN environment may operate entirely within a single zone, and a simple production deployment may have a secure administrative zone used for management purposes and an open operational zone used for dynamic network programming. Multi-tenant or multi-application deployments may utilize unique zones for each customer or function or application. There is no fundamental restriction to how zones can be partitioned. In some examples, zones are partitioned on a per IP address, per port, per VLAN, or possibly per subnet basis, but this concept can be usefully extended on a per protocol basis or to any other packet header field or per application or per user. SDN controller 112 may ensure that a flow rule written for one zone incorporates sufficient additional match rules to prevent flows from other zones from being processed inappropriately. Zones may be ordered by numerical priority to avoid confusion that may otherwise occur when overlapping partitions are created. Each zone may support OpenFlow, normal distributed, hybrid, or even alternate protocol types independently. Zones can also be used to partition off areas where no traffic is expected, allowing illegitimate traffic to be black holed, spanned, or redirected elsewhere for further action.

Control unit 130 may also maintain data representative of a history of statistics for elements of SDN 106, such as switches, switch ports, flows, and flow groups. Statistics 146 of FIG. 2 represents this data. The statistics entry for each instance in time may be dynamically extensible to allow additional counters and other values to be added as the system is extended. Statistics 146 may include a set of data entries, where each entry includes date and time of the last update, packet count, byte count, received packets count, received byte count, transmitted packet count, transmitted byte count, receive errors, transmit errors, received frame errors, transmit frame errors, and collisions.

Control unit 130 may also maintain an event record 144. Event record 144 includes data representative of an event history, which describes significant changes to SDN 106 (that is, system state). Each event of event record 144 may include data representing a time and date of the event, an event type, an event source, a severity of the event, a text description of the event, and an optional list of values (e.g., for arguments).

In some examples, SDN controller 112 may configure network devices (e.g., switches) of SDN 106 to each other and to one or more of service devices 116. In this manner, SDN controller 112 may be configured to act, in a DMZ, as an interconnect system for in-line network appliances such as firewalls, intrusion prevention systems, and load balancers, or for out-of-band appliances such as intrusion detection systems, transaction or performance monitors, and network analysis devices. In these environments, L1-L2 connections between devices may be made using L2-L4 or even application-level intelligence. This allows the implementation of "wire-once" DMZ architectures, supporting flexible and dynamic insertion, removal, and maintenance of diverse appliances. In addition, by gathering packet and flow statistics at each connection point, SDN controller 112 may provide a consistent monitoring and debugging view of SDN 106 and the behavior of all attached appliances, allowing unexpected behavior to be quickly analyzed and isolated.

Service device control unit 138 may interact with services devices 116 to provide various services to packet flows through SDN 106. Such services may include security services as discussed above, as well as (or alternatively) services including monitoring loss-sensitive applications that require continuous congestion and latency monitoring. These services can be combined on a per-system, per-port, per-VLAN, per-MPLS path (e.g., set of one or more MPLS labels), or per-subnet basis with, allowing the user (e.g., administrator 114) to customize the behavior of SDN controller 112 to meet business-specific requirements. Such monitoring may be performed by a monitoring service device that monitors, e.g., packet loss, congestion, and/or latency. SDN controller 112 may form a path associated with a loss-sensitive network application such that the path includes the monitoring service device. In response to detection of loss by the monitoring device, SDN controller 112 may reprogram network devices to reduce loss, congestion, and/or latency, e.g., by directing traffic along a backup path.

One example use case for SDN controller 112 includes performing internal security zone partitioning. In today's enterprise environment, certain flows can be trusted, based on security controls placed on the end points, while others must be assumed to have some potential for risk. SDN controller 112 may create security zones based both on physical topology as well as threat assessments based on L2-L4 header information. Business-level security rules can be implemented directly on SDN controller 112 to direct only higher risk flows through specific L4-L7 devices (e.g., service devices 116) to monitor for or block malicious traffic. That is, when an SDN interconnects a set of enterprise network devices of a common enterprise network and also provides connections for the enterprise network devices outside of the enterprise network, SDN controller 112 may determine that connections between the enterprise network devices within the enterprise network can be trusted, whereas connections to network devices outside the enterprise network cannot be trusted and, therefore, should be monitored by a security device.

Thus, SDN controller 112 may determine separate sets of packet flows based on security controls, e.g., a first set of packet flows that can be trusted and a second set of packet flows that are not trusted. Then, SDN controller 112 may determine a first set of one or more paths for the first set of packet flows that omit a security device for the first set of packet flows (that is, based on the determination that the first set of packet flows can be trusted), and a second set of one or more paths for the second set of packet flows that direct the second set of packet flows through the security device (based on the determination that the second set of packet flows are not trusted).

The security controls may include various types of information. For example, the security controls may specify values for one or more packet headers at various layers of the Open Systems Interconnection (OSI) network model. The security controls may specify information for any or all of network layers two, three, four, five, six, and/or seven of the OSI model.

Another example use case for SDN controller 112 includes establishing a perimeter DMZ interconnection. Traffic entering a data center must often be distributed to a variety of appliances or server-based application-aware devices based on potentially deep inspection of incoming (and for certain flow types, outgoing) packets. Rather than route all traffic through L4-L7 firewalls or application load balancers, or utilize distributed protocols such as policy based routing with limited capability and complex network interactions, SDN controller 112 may allow customers (e.g., administrator 114) to directly sort traffic on a per-packet or per-flow basis for individualized processing, saving cost, improving performance, limiting risk, improving availability, and increasing control.

Another example use case for SDN controller 112 includes establishing a "big data" DMZ. Scientific research applications often generate extremely large data sets that must be transferred from a distant source into a local data center, from a central storage repository into a remote data processing center, or among data centers. These data transfers are marked by extremely high bandwidth and/or long transfer times, and as such are sensitive to disruption. At the same time, other types of transactions to or from these areas must be carefully secured. SDN controller 112 allows the well-defined large flows to pass through switches of SDN 106 under the limited protection of high-speed L2-L4 access control lists (ACLs), while other transactions pass through traditional L4-L7 firewalls for enhanced security.

Yet another example use case for SDN controller 112 includes establishing a service provider point of presence (POP). A service provider may provide both intranet and internet WAN services for a number of enterprises. A service provider may also, or alternatively, provide datacenter networks, in addition to or in the alternative to WAN services. The level of security required for intra-enterprise traffic, for example between campus locations in different cities, may be quite different from the level of protection required for traffic between enterprises or for general internet traffic. In addition, the service provider may be asked by an enterprise to provide value-added services (such as security, denial of service (DOS) protection, traffic filtering, and/or wide area network (WAN) acceleration) on incoming or outgoing traffic based on source and destination. SDN controller 112 provides a highly manageable and flexible interface to direct flows according to a wide variety of service models.

In addition or in the alternative to the above, control unit 130 may be configured to utilize external triggers and information to change rules within programmable flow devices, e.g., switches of SDN 106. In particular, path determination unit 134 may be configured to utilize security information 148 to develop paths through SDN 106 to provide protection to SDN 106. SDN controller 112 may develop rules, stored in rules 142, that define triggers associated with events that cause control unit 130 to program network devices of SDN 106 via SDN interface 152 in response to the triggers. SDN controller 112 may program the network devices of SDN 106 such that, in response to one of the triggers "firing," that is, becoming activated, the network devices modify forwarding information for a packet flow related to the external trigger that fired.

In addition, SDN controller 112 may be configured to direct specific packet flows (or direct duplicate versions of packets in a flow) to network recording devices or to network analysis devices, for additional visibility on packet flow patterns, or for logging, auditing and troubleshooting. These network recording devices and network analysis devices can write the packets corresponding to flows to permanent media for archival.

As an example, service device control unit 138 may configure a DDoS detection device of service devices 116 to send data to SDN controller 112 in response to the detection of a suspected DDoS attack. In response to such an attack, control unit 130 may reprogram switches of SDN 106 to mitigate the suspected attack. More particularly, in response to receiving data from the DDoS detection device that indicates that a DDoS attack is suspected, control unit 130 may reprogram devices of SDN 106 to mitigate the suspected attack. The use of such triggers may provide various advantages over conventional DMZs for networks, such as automation, increased flexibility, increased uptime (that is, business continuity), increased security, network flexibility, and reduction in costs due to added functionality to existing network hardware and software. As another example, an external routing stack (such as Quagga executing on a device separate from a switch) may act as an external trigger to change how and where flows are directed.

More particularly, control unit 130 may configure any of service devices 116 to send data representative of a particular event to SDN controller 112, and control unit 130 may automatically reprogram one or more network devices of SDN 106 in response to such data. For example, security monitoring applications of service devices 116 may determine that a specific source port, destination port, source IP address, destination IP address, or the like should be acted upon. Alternatively, security monitoring applications may determine that, due to content or deep packet inspection, a specific type of traffic is malicious and should be blocked. In either case, the corresponding one of service devices 116 may send a message to SDN controller 112 representative of these determinations. As yet another example, a network performance device may monitor various performance metrics, such as latency, jitter, packet loss, or the like, and provide feedback data to SDN controller 112 based on these metrics. SDN controller 112 may respond by programming network devices of SDN 106 to perform a programmed action, such as allowing corresponding traffic, blocking corresponding traffic, mirroring corresponding traffic, redirecting corresponding traffic.

SDN controller 112 may receive data from service devices 116, e.g., in relation to triggers for reprogramming devices of SDN 106, in one or more ways. For example, SDN controller 112 may expose (that is, provide) an application programming interface (API) to service devices 116. The API may be a one-way API or a two-way API. For the one-way API, service devices 116 push event data via the API to SDN controller 112. In response, SDN controller 112 may apply a policy based on rules 142 to reprogram network devices of SDN 106. In the example of the one-way API, SDN controller 112 does not provide any information to the one of service devices 116 that executed the API. SDN controller 112 may further log the event in event record 144.

For the two-way API, one of service devices 116 may execute the API to send data to SDN controller 112. As with the one-way API, SDN controller 112 may respond according to a policy based on one of rules 142, and log the event in event record 144. However, in the case of the two-way API, SDN controller 112 may respond to the one of service devices 116 that sent the data with an indication when SDN controller 112 has completed acting upon the received data, or if the function cannot be performed, provide indication of the reason why the function cannot be performed.

As another example, SDN controller 112 may specify times and file locations at which SDN controller 112 will retrieve data from service devices 116. In this manner, SDN controller 112 may pull specific files that contain data regarding events for triggering SDN controller 112 to perform particular actions from service devices 116. SDN controller 112 may repeat this file checking on a scheduled basis, and log various events from the files in event record 144. In this manner, SDN controller 112 may determine a time for retrieval of a file from a service device, and retrieve the file from the service device at the determined time.

As yet another example, SDN controller 112 may subscribe to event logs of service devices 116. SDN controller 112 may be configured to filter received event log data based on, e.g., date, time, application, event type, or frequency of event during a specific time horizon. In this manner, event record 144 may become synchronized, or at least one-way synchronized, with event logs of service devices 116. In still another example, SDN controller 112 may receive external triggers via existing alerting mechanisms such as email, short message service (SMS), RESTful APIs, XMPP messages, SNMP alerts, or rich site summary (RSS). In this manner, SDN controller 112 may subscribe to one or more event logs from a service device, and retrieve data from the service device using the subscription.

Events sent to SDN controller 112 may trigger one or more of the SDN controller 112 actions on the same or different network, switch, and/or port than the network, switch, and/or port the initial traffic came from. For example, for DDOS, the identification of the DDOS attack may trigger a block action on the network under attack, trigger a block action to the upstream internet service provider (ISP) network (or a specific upstream device), and/or trigger a counter attack (redirection) from a different network, ISP, or network device (physical or virtual).

With each action, SDN controller 112 may perform various responsive actions. For example, control unit 130 may rebuild a new table detailing rules 142 that are enforced on each network device connected to SDN controller 112. This information may then be presented to users via user interface 150, e.g., using a graphical user interface, a human readable report including text, graphs, and/or charts, which may be used for internal or external audit purposes, and/or using an outbound API to communicate the new current state of SDN 106 to a third party security and compliance software application.

SDN controller 112 may then log the statistics from each network device as statistics 146. Such statistics may include data indicative of programmed actions taken by the network devices in response to determining that the SDN controller 112 may further enforce the actions or provide an auditable log trail for security and compliance, and/or for troubleshooting.

SDN controller 112 may selectively share both the action information as well as the log analysis with the third party applications via a static file or API connection. Specifically where this may be useful is communicating the updated rules 142 to the application and sending an indication of the event that triggered the actions, to close the loop. A user may also choose to push all or a portion of event record 144 to a security information and event management (SIEM) device or system, such as Splunk or ArcSight.

In addition, or in the alternative, SDN controller 112 may be configured to test paths through SDN 106. In particular, path verification unit 136 may verify whether paths are operating correctly (that is, determine whether devices are malfunctioning), e.g., by injecting test traffic into SDN 106. Additionally or alternatively, path verification unit 136 may analyze statistics from packet flows through paths of SDN 106 to determine whether the paths (specifically, devices along the paths) are operating correctly. In this manner, SDN controller 112 may be configured to provide flow-based controls coupled to a server with special software to both consume and display packet flows as well as proprietary software than can inject test flows into the setup.

Based on the rule set for a specific device, including what traffic is allowed through, from what zones and expected targets, administrator 114 can infer the right type of test traffic that should be injected for both positive and negative testing of the device. Similarly, the inference can be made to determine the appropriate type of flow troubleshooting that includes the appropriate IP ranges to watch on, and the TCP/UDP services that the flowchain is meant to service.

In the case of traffic injection to test a path through SDN 106, path verification unit 136 of SDN controller 112 may perform any of the following tasks:

Infer from the flowchain the appropriate type of transmission control protocol (TCP) or uniform datagram protocol (UDP) services that are relevant to the chain, as well as the range of source and target IP addresses for this chain Create either UDP packet flows or TCP sessions that confirm to the traffic type inferred or discovered form the flowchain configuration Using an SDN device (e.g., a switch of SDN 106), inject these flows or TCP sessions by temporarily inserting a rule into the rules table on the switch that will take the flows from SDN controller 112 and send them across the devices of SDN 106 (starting from the ingress device in the chain)

Using an SDN device, insert flow rules to replicate (flow-span) these same traffic streams at each point in the flow chain. The replicated traffic may be directed (via SDN rules) to a collection device (or to SDN controller 112) that can determine whether the test packets passed through each port on the switch that is part of the flowchain On the final exit device (prior to the end target), insert a flow rule that will drain all injected packets so the final devices (that is, devices external to SDN 106) do not see any of the test traffic.

This capability can be presented as part of a flow-setup screen, such as "test all flows." SDN controller 112 may use the above mentioned methods to automatically ascertain whether devices within SDN 106 will pass a stream of packets as programmed. If the flow-chain is unable to pass the packets, SDN controller 112 may highlight the exact port/device on which the flows failed, using the techniques described above. Additionally or alternatively, SDN controller 112 may use the above methods to perform "negative testing," to ensure that flows that do not conform are in fact not forwarded, and are appropriately blocked.

In addition to the flow-injection capability, such a setup also provides SDN controller 112 the ability to "flow-span" (i.e. pick out a specific flow for replication) into SDN controller 112. SDN controller 112 can run a capture-file dissector (like Wireshark) that processes the replicated flows and is able to present the captured data in a reasonable manner. As many such "inspection" setups as needed can be run, using flow-rules to configure which flows should be picked for inspection. When inspection is complete, the flow-rules can be turned off None of the above steps negatively impact production traffic streams, and none of this requires manual re-cabling of the setup.

In addition, or in the alternative, path determination unit 134 may determine one or more redundant paths between two endpoints, e.g., to perform high availability. Data path (or flowpath) resiliency is a complex problem related to high availability, especially with respect to SDN networks such as SDN 106. In order to focus development and test efforts, as well as to simplify the options to a tractable solution set, SDN controller 112 may perform any or all of the following three primary high availability implementations.

In general, each datapath switch of SDN 106 may be tagged by SDN controller 112 as being redundant or non-redundant. Generally, non-redundant elements are only found at the "leaf" points of a network, for example, access switches or vSwitches. Like controllers, a redundant switch can have the attribute of being master (active), slave (standby), or equal (load balanced) to one or more designated peer(s). The initial design assumes that the connectivity of peer switches is logically identical at the port level. In the future, redundancy attributes may be assignable at the port level, allowing for more flexible deployments. Once the resilient pairings are established, the SDN controller 112 user interface builds and enforces the switch/port correspondence.

A number of triggers can alert SDN controller 112 that a switch or other device of SDN 106 has experienced a failure. These include internal watchdog timers, link failures, various switch or route protocol (L2 ring resiliency protocols or L3 BFD protocols, for example), timeouts, disappearance of controller-generated debug/trace packets, or other external appliance-generated triggers.

One example solution is a hard failover. If any element of a specific FlowPath experiences a failure, the entire redundant portion of the path may be brought down (including links, if desired). The intended effect is that all traffic will transition to the secondary path. Flows that had been following the failed path may need to expire prior to the new connection being established from client to server.

In another example, SDN controller 112 may re-route traffic around the specific point of failure. Each element may be designated as either "fail-open," in which case traffic must be routed through the equivalent element on the redundant path, or "fail-closed," in which case traffic can simply bypass the failed element within the current path (if one exists, else the device is treated as fail-open). Depending on whether various network elements are promiscuous or act as L2 or L3 devices, appropriate modifications may need to be done to the MAC or IP addresses of each packet in the flow. Each one of the above actions reflects a decision that is represented within the object model and the graphical user interface.

In another example, it is assumed that redundant attached appliances handle failures as a pair independent of switches of SDN 106. In this case, failures are simply reported to SDN controller 112 as informational, as no direct action needs to be taken.

Figure 3:
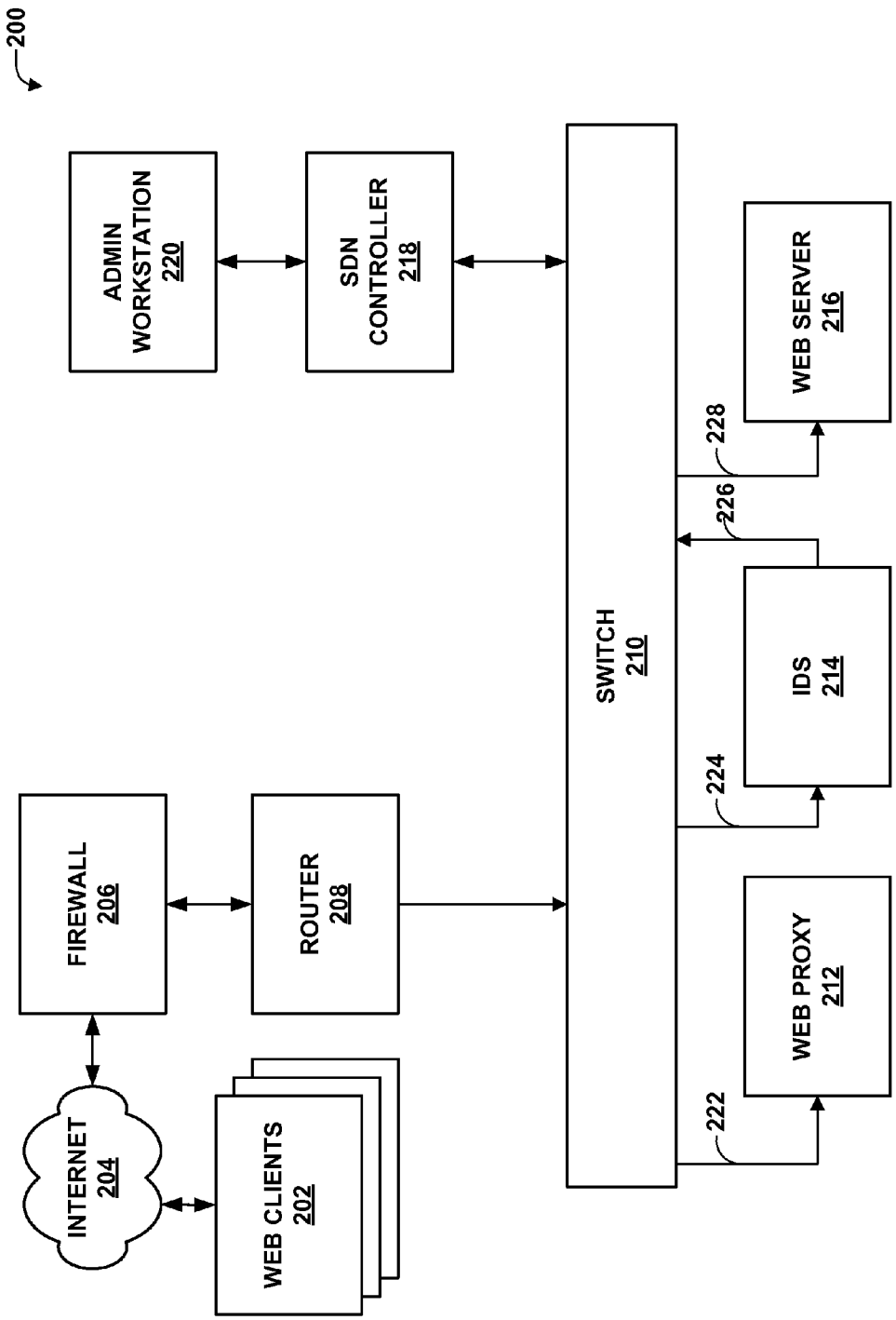
FIG. 3 is a conceptual diagram illustrating an example system including various devices that may be used in accordance with the techniques of this disclosure.
Figure 4:
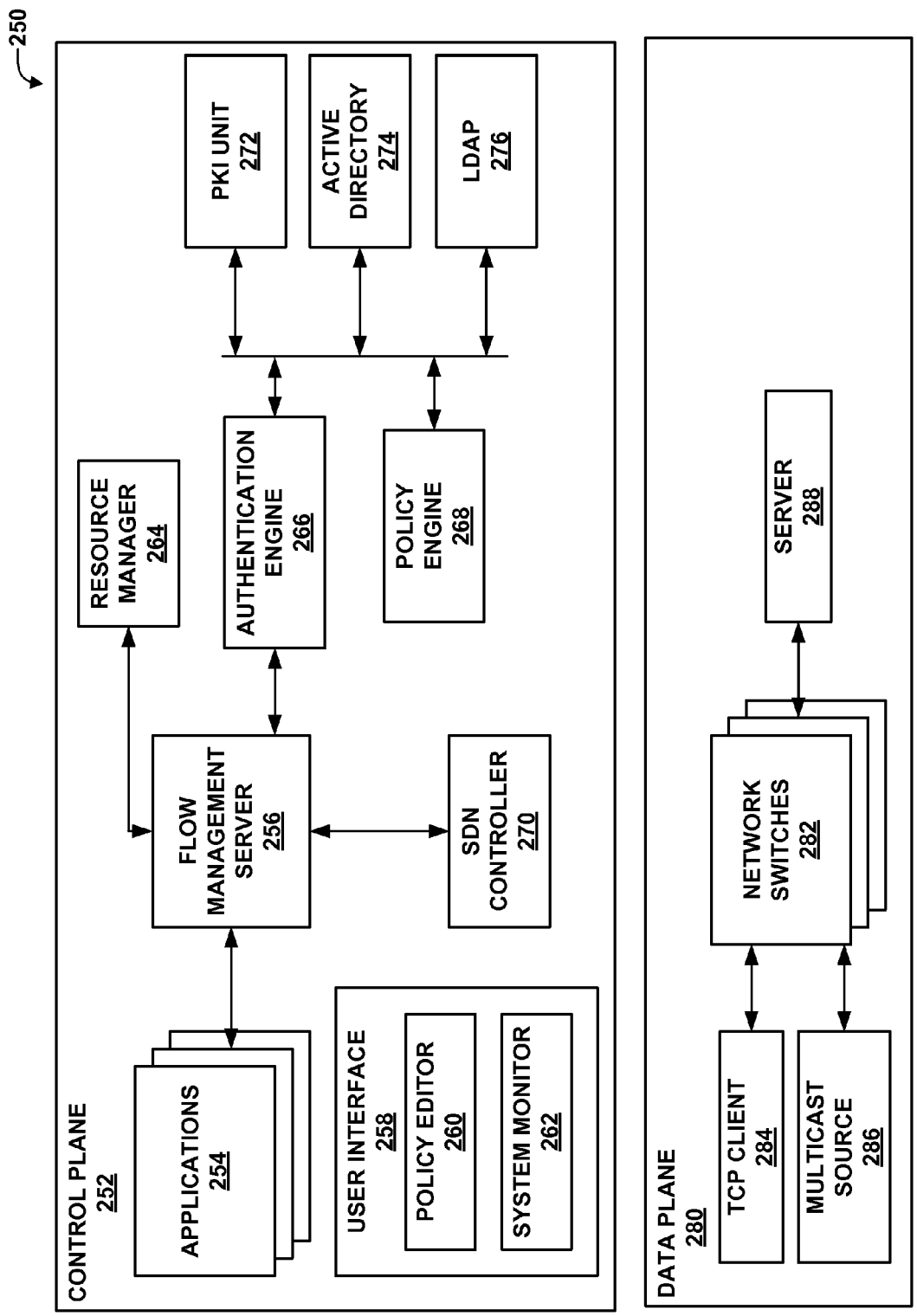
FIG. 4 is a conceptual diagram illustrating another example system including various devices that may be used in accordance with the techniques of this disclosure.

SDN controller 112 may be configured to perform any or all of the techniques described above, alone or in any combination. Moreover, the set of elements shown in FIG. 2 for SDN controller 112 is merely one example. FIGS. 3 and 4 below illustrate other portrayals of devices and systems that may implement any or all of the techniques of this disclosure.

FIG. 3 is a conceptual diagram illustrating an example system 200 including various devices that may be used in accordance with the techniques of this disclosure. In this example, system 200 includes various network devices, including firewall 206, router 208, switch 210, web proxy 212, intrusion detection system (IDS) 214, web server 216, administrator ("admin") workstation 220, and software defined network (SDN) controller 218. Web clients 202 can access system 200 via a network, such as the Internet, e.g., Internet 204. Internet 204 may include additional network devices not explicitly shown in FIG. 3, such as routers, switches, hubs, gateways, security devices, or the like.

As shown in FIG. 3, web clients 202 connect to Internet 204. Internet 204 provides access to system 200, which implements the techniques of this disclosure. For example, network devices of system 200 form an SDN controlled by SDN controller 218. SDN controller 218 may generally correspond to SDN controller 112 of FIGS. 1 and 2. In particular, SDN controller 218 (in this example) programs one or more switches (e.g., Pica8 3290 switches, IBM G8264), such as switch 210, to direct traffic through an SDN to other switches, service devices (e.g., web proxy 212, IDS 214, and/or web server 216). In general, SDN controller 218 may be configured to perform any or all of the techniques described above, alone or in any combination.

SDN controller 218 is configured to program various network devices, such as switch 210, in accordance with one or more of the techniques of this disclosure. Although the example of FIG. 3 illustrates only one switch, i.e., switch 210, it should be understood that system 200 may include many interconnected switches or other programmable network devices. Likewise, service devices, such as web proxy 212, IDS 214, and web server 216 may be coupled to various switches (and not necessarily the same switch).

In some examples, SDN controller 218 determines connections between network devices (e.g., switches) in a software defined network. For example, SDN controller 218 may cause switches of system 200 to execute a protocol, such as the spanning tree protocol (or a proprietary protocol), to discover connections between switches. SDN controller 218 may determine connections between network devices that form an SDN for system 200, which may include switches similar to switch 210 and service devices, such as web proxy 212, IDS 214, and web server 216.

A user, such as an administrator, determines service devices, such as web proxy 212, IDS 214, and web server 216, to which particular devices (e.g., users of web clients 202) request access. The user may interface with administrator workstation 220 to configure SDN controller 218, to provide information indicative of users and services required for those users. SDN controller 218, in turn, may develop packet flows that ensure web traffic from particular ones of web clients 202 (and, potentially, certain applications executed by web clients 202 and/or with certain destinations) are directed through appropriate service devices. In other words, based on the connections determined between network devices in an SDN of system 200, SDN controller 218 may determine one or more paths for network traffic between the network devices. Likewise, SDN controller 218 may program the network devices to direct network traffic along the paths.

In some examples, SDN controller 218 may be configured to program one or more paths through the SDN of system 200 for the same packet flow. That is, the paths for a packet flow may include a primary path and one or more backup paths for the packet flow. In this manner, when a device along the primary path malfunctions, SDN controller 218 may send data to the devices of the SDN (e.g., devices similar to switch 210) to forward traffic for the packet flow along one of the backup paths. The backup paths may be formed initially or on the fly. For example, the backup path to a primary path may avoid as many of the network devices along the primary path as possible, which in some cases may include all of the devices along the primary path. In other words, the devices along the primary path may be entirely different than the devices along the backup path. That is, the intersection of the set of devices in the primary path with the set of devices in the backup path yields the empty set.

Alternatively, the backup path may simply exclude any malfunctioning devices of the primary path, but otherwise include the other devices of the primary path that are not determined to be malfunctioning. As still another example, the backup path may include all devices of the primary path up to the malfunctioning device, and then may or may not include other devices along the primary path. In some cases, SDN controller 218 may determine when a network device along the primary path has failed. Alternatively, SDN controller 218 may program a service device to monitor network devices of the SDN and to determine when one or more of the network devices have failed, to cause switchover between a primary path and a backup path.

SDN controller 218 may be configured to program a switch, such as switch 210, to send packets of a particular packet flow to a service device, e.g., one of web proxy 212, IDS 214, and web server 216. For example, switch 210 is communicatively coupled to web proxy 210 by connection 222, which may represent ports 7 and 8. One of web clients 202 may request data from a web server, which may be internal to or external to system 200. Web proxy 212 may be configured to act as a proxy device to the web server. That is, SDN controller 218 may program switch 210 to direct network traffic destined for the web server to web proxy 212 via connection 222, instead. Web proxy 212 may then act on behalf of the web server, e.g., by caching resources stored by the web server and responding to requests for the resources on behalf of the web server.

As another example, switch 210 is communicatively coupled to IDS 214 via connections 224, 226. Connection 224 may represent port 9, while connection 226 may represent port 10. After SDN controller 218 determines that a particular packet flow should be inspected for intrusion detection, SDN controller 218 may program switch 210 to direct packets of the packet flow to IDS 214. SDN controller 218 may further configure IDS 214 to send data back to switch 210, such as data indicating whether packets of the packet flow represent a network attack and/or data of the packet flow after the data has been inspected. In some examples, data of the packet flow representing an attack may be dropped or forwarded to a containment device, rather than being forwarded along the original packet flow. The data indicating whether the packet flow represents an attack may be forwarded back to SDN controller 218, to admin workstation 220, to one of web clients 202, or to another device, e.g., for report generation. The device that receives the data, e.g., SDN controller 218, may generate and/or present a report indicative of malicious traffic to a user, e.g., via admin workstation 220.

As yet another example, switch 210 is communicatively coupled to web server 216 via connection 228. Connection 228 may represent ports 4 and 6. Web server 216 may generally store and/or manage network accessible resources, such as files, databases, printers, or the like. Web clients 202 may access web server 216 via the SDN of system 200.

As noted above, SDN controller 218 can program and reprogram network devices that make up the SDN of system 200 dynamically. That is, after determining physical connections between network devices, SDN controller 218 may program the network devices to forward network traffic along various paths through the SDN, that is, along various network paths. In some instances, it is important to verify that the network devices are forwarding traffic along a path correctly, e.g., to ensure that the network devices are operating correctly. Therefore, SDN controller 218 may be configured to inject test traffic into the SDN to test one or more of the packet flows or paths.

For example, SDN controller 218 may be configured to program network devices of the SDN (e.g., including switch 210) to form a path though the SDN (where the path may correspond to a packet flow). This may cause the network devices to forward packets of the packet flow along the path. SDN controller 218 may then send a packet to a first network device along the path as a test packet. The network devices along the path may be configured to send confirmation messages to SDN controller 218 after receiving the test packet. After the last network device along the path receives the test packet, the last network device may forward the packet back to SDN controller 218 or drop the packet and send a confirmation message to SDN controller 218. When SDN controller 218 determines that a particular network device along the path did not confirm receipt of the test packet within a particular amount of time, SDN controller 218 may reattempt the test packet or determine that the device that did not confirm the packet is malfunctioning.

In response to the determination that a device along a path is malfunctioning, SDN controller 218 may reprogram devices along the path to direct traffic around the malfunctioning device, such that the packet flow can remain operable. Additionally or alternatively, SDN controller 218 may send an alert to a user, e.g., via admin workstation 220, that a device is malfunctioning. More generally, SDN controller 218 may present a report indicative of the status of a packet flow, e.g., whether network devices are forwarding packets of the packet flow properly.

SDN controller 218 may be configured to utilize a particular data model to represent devices of the SDN, such as SDN controller 218 itself (and any other SDN controllers), switch 210 (and other switches not shown in FIG. 3), web proxy 212, IDS 214, and web server 216. The data model may include objects (e.g., in accordance with an object oriented programming paradigm) that represent the various devices forming the SDN of system 200. For example, the data model may include software-based controller objects that represent SDN controllers, such as SDN controller 218. The data model may also include switch description objects for each of one or more switches, such as switch 210.

The controller-objects may include data describing an instance name, a server hostname, and server host port for respective SDN controllers. That is, one instantiation of a controller-object may include an instance name, a server hostname, and a server host port for SDN controller 218. An example of an instance name would be "datacenter-sdn-controller-primary-a", a server hostname would be "controller.lab.domain.com," and an example server port number would be "6688."

The switch description objects may include data describing a primary controller for the respective switch, a switch identifier, a switch media access control (MAC) address for the respective switch, an Internet protocol (IP) address for the respective switch, and an array of port description objects for each physical port on the respective switch. For example, for switch 210, a switch description object may include data identifying SDN controller 218 as the primary controller for switch 210, an identifier for switch 210, a MAC address for switch 210, an IP address for switch 210, and an array of port description objects that describe ports of switch 210, such as the ports forming connections 222, 224, 226, and 228. Each of the port description objects may include data describing a port number for the respective port, a port identifier for the respective port, a MAC address of the respective port, and a description of capabilities for the respective port (e.g., a media type for the respective port, a speed for the respective port, whether the respective port is half duplex or full duplex, whether the port supports auto-negotiation, or the like).

SDN controller 218 may further monitor devices of the SDN of system 200 to determine whether changes have occurred. For example, SDN controller 218 may determine whether additional connections have been added between network devices, whether links have failed, whether network devices have failed, or whether network devices have been added. When such changes occur, SDN controller 218 may log data describing the changes in an event history. In addition, SDN controller 218 may reprogram the network devices to account for such changes, e.g., to incorporate new links and/or new network devices into paths, or to route traffic around failed links and failed network devices.

In this manner, SDN controller 218 may be configured to operate in a manner substantially similar to SDN controller 112 of FIGS. 1 and 2. That is, SDN controller 218 may implement any or all of the techniques of SDN controller 112, alone or in any combination.

FIG. 4 illustrates various devices and services organized according to the "control plane" and the "data plane." In general, devices and services of the control plane manage devices of the data plane to cause the devices of the data plane to forward data traffic between various network destinations. In conventional routers, each router includes functionality for both the control plane and the data plane, and the same is true for conventional switches. However, in accordance with the techniques of this disclosure, the control plane can be entirely separated from the data plane, such that an SDN controller, such as SDN controller 112, can program devices of the data plane, such as network switches, to perform the techniques of this disclosure.

FIG. 4 is a conceptual diagram illustrating an example flow management system 250 including various components that may operate in accordance with the techniques of this disclosure. Flow management system 250 (also referred to as "system 250") includes control plane 252 and data plane 280. In general, control plane 252 includes components that relate to control information, e.g., routing information relating to packet flows and paths through an SDN. Data plane 280 generally includes components that send, forward, and/or receive data in accordance with control information from components of control plane 252.

In the example of FIG. 4, control plane 252 includes applications 254, user interface 258 (which defines policy editor 260 and system monitor 262), flow management server 256, SDN controller 270 (which may correspond to an OpenFlow controller), resource manager 264, authentication engine 266, policy engine 268 (e.g., an XACML policy engine), PKI unit 272, active directory 274, and LDAP 276. Data plane 280, in this example, includes TCP client 284, multicast source 286, network switches 282, and server 288. TCP client 284 may correspond to any client device, e.g., client device 102 (FIG. 1) or one of web clients 202 (FIG. 3). Multicast source 286 represents a source device that sends data via a multicast protocol, while server 288 represents a server device can provide data in accordance with one or more various protocols, e.g., hypertext transfer protocol (HTTP), file transfer protocol (FTP), or the like.

OpenFlow is an example of an SDN protocol. That is, in some examples, SDN controller 270 may conform to the OpenFlow protocol. However, it should be understood that other protocols may be used in conjunction with a software defined network. In general, any protocol that gives access to the forwarding plane or data plane of a networking device (e.g., a switch or router) to a remote device over a network may be used in accordance with the techniques of this disclosure, other example protocols include XMPP, RESTful APIs, Cisco OnePK, IETF I2RS (Interface to Routing Systems).

In the example of FIG. 4, flow management server 286 may be configured to perform the techniques of this disclosure. Additionally or alternatively, SDN controller 270 may be configured to perform the techniques of this disclosure. Alternatively, flow management server 256 and SDN controller 270 may work together to perform the techniques of this disclosure. Thus, any or all of flow management server 256 and/or SDN controller 270 may correspond substantially to SDN controller 112 of FIGS. 1 and 2, or to SDN controller 218 of FIG. 3. Flow management server 256 is described as performing the techniques of this disclosure below for purposes of explanation, but it should be understood that SDN controller 270 may implement these techniques, alone or in combination with flow management server 256, in some examples.

In accordance with the techniques of this disclosure, flow management server 256 programs network switches 282, based on connections between network switches 282, to form paths through an SDN. For example, flow management server 256 may program network switches 282 to establish a path between TCP client 284 and server 288, and/or a path between TCP client 284 and multicast source 286. In some examples, flow management server 256 may program network switches 282 to define multiple paths, e.g., a primary path and one or more backup paths, as discussed above. Likewise, flow management server 256 may send test traffic through network switches 282 to test one or more of the paths. Data plane 280 may include one or more service devices (such as web proxy devices, IDS devices, and/or web servers), to which network switches 282 may direct network packets. Server 288 may represent a service device of an SDN controlled by control plane 252, in some examples.

Figure 5:
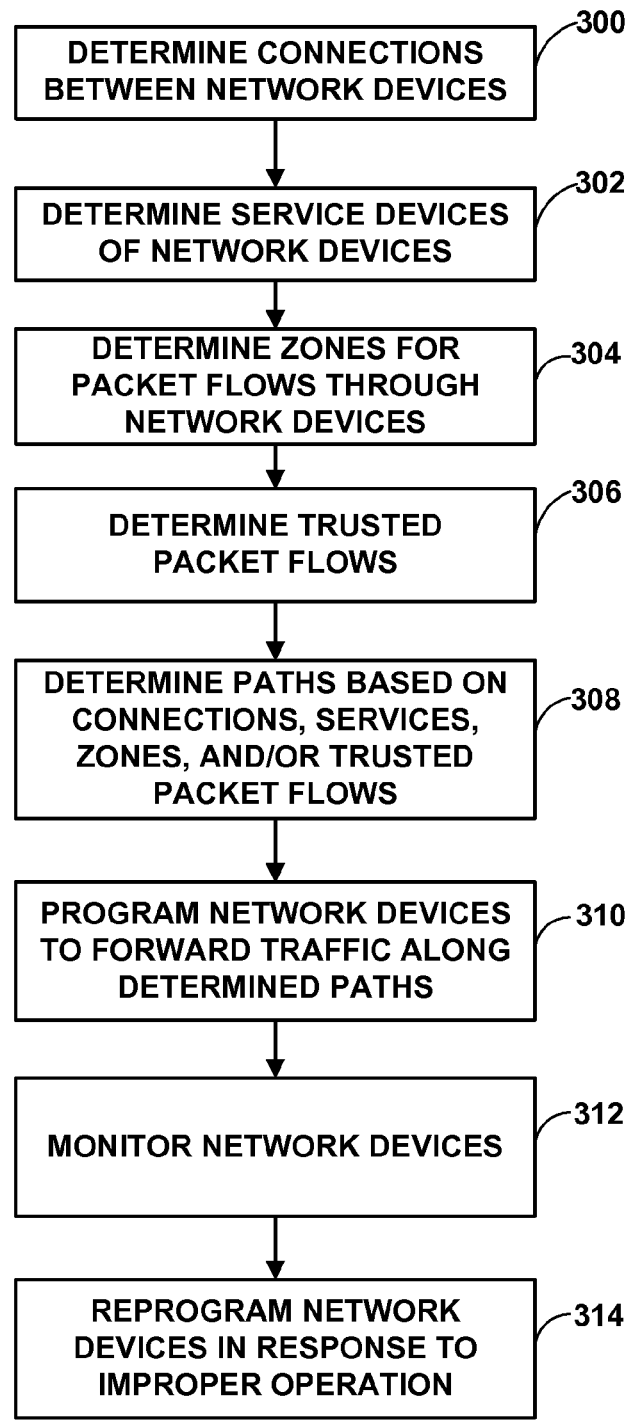
FIG. 5 is a flowchart illustrating an example method for constructing paths in an SDN.

FIG. 5 is a flowchart illustrating an example method for constructing paths in an SDN. The method of FIG. 5 may be performed by an SDN controller, such as SDN controller 112 (FIGS. 1 and 2) or SDN controller 218 (FIG. 3). Likewise, the method of FIG. 5 may be performed by flow management server 256 and/or SDN controller 270, alone or in combination. For purposes of explanation, the method of FIG. 5 is primarily described with respect to SDN controller 112, although it should be understood that other devices, such as those mentioned above, may be configured to perform the method of FIG. 5.

Initially, SDN controller 112 determines connections between network devices of an SDN (300). For example, network devices of the SDN (such as network devices 108, 110, which may correspond to network switches) may be configured to send acknowledgements to SDN controller 112 in response to receiving packets from SDN controller 112, as well as to forward the packets to other network devices to which the network devices are communicatively coupled. By analyzing the responses from the network devices, SDN controller 112 may determine connections between network devices of an SDN. For example, all ports on one network device 110 might be programmed to send all incoming packets of a certain type to the SDN Controller 112. By sending an appropriately crafted packet (of the same type) on all ports of 108, the SDN Controller can determine how Network Device 108 is connected to Network Device 110.

SDN controller 112 may also determine whether certain network devices of the SDN are service devices (302). In particular, SDN controller 112 may determine whether a network device of the SDN can provide services, such as security services, proxying services, hosting services, or the like. This information may be advertised by the network devices themselves, or may be input by a user (e.g., an administrator).

In some examples, SDN controller 112 forms a data model representative of devices in the SDN, in which case SDN controller 112 may instantiate controller objects in software for itself and any other SDN controllers, and instantiate switch description objects for each of the network devices (e.g., switches) of the SDN. Furthermore, SDN controller 112 may form an array of port description objects, for a particular switch description object, that each describe respective ports of the switch modeled by the switch description object. The port description objects may indicate a media type for the respective port, a speed for the respective port, whether the respective port is half duplex or full duplex, and whether the port supports auto-negotiation.

In some examples, the port description objects additionally include data describing a device to which the port is connected, e.g., an identifier for a controller, switch, or other network device to which the port is connected. Additionally or alternatively, SDN controller 112 may store other data defining connections between devices of the SDN in the data model representative of the SDN. For example, SDN controller 112 may construct the data model to include a list (e.g., an array) of pointers or identifiers, for a particular switch description object, indicative of switches, controllers, or other network devices (e.g., service devices) to which the switch is connected. In addition, SDN controller 112 may use other data structures (e.g., a tree or graph) to determine the potential relationships in physical or virtual connectivity between these network devices.

In the example of FIG. 5, SDN controller 112 determines zones for packet flows through the network devices forming the SDN (304). The zones generally correspond to packet flows, that is, paths through the SDN followed by particular packets. SDN controller 112 may store data defining the zones in the data model discussed above. The data defining the zones may specify entities (e.g., users, devices, or the like) that have access to each zone. Thus, SDN controller 112 may program network devices of the SDN such that entities that are not authorized to access a particular zone are prevented from accessing the zone. SDN controller 112 may specify a zone using packet header field values, such as a source port, a destination port, a source IP address, a destination IP address, a virtual local area network (VLAN) tag, multiprotocol label switching (MPLS) labels, a packet protocol, and/or an IP subnet. In some cases, SDN controller 112 may specify whether a corresponding packet flow for a zone is suspect or malicious and construct the zone such that packets of the packet flow are prevented from reaching an intended destination. As noted above, zones may be ordered based on priority values when overlap occurs.

Furthermore, SDN controller 112 determines trusted packet flows (306). For example, SDN controller 112 may determine that certain packet flows can be trusted based on security controls, and that other packet flows cannot be trusted based on the security controls. That is, SDN controller 112 may determine whether a packet flow can be trusted based on values of packet headers for the packet flows, e.g., values of headers at various layers of the OSI model (e.g., any or all of layers 2-7 of the OSI model). In some examples, SDN controller 112 may omit any or all of steps 302, 304, and 306, e.g., omitting any or all of determination of service devices, determination of zones, and/or determination of trusted packet flows.

SDN controller 112 may then determine paths through the SDN for various packet flows based on the connections between the network devices, the services offered by the service devices, the determined zones, and/or the trusted packet flows (308). For example, SDN controller 112 may determine that a particular customer has subscribed to a particular service (e.g., IDS) and, therefore, direct packet flows from a client device for that customer through an IDS device. In other words, SDN controller 112 may construct a path through the SDN for that customer that includes at least one IDS device. Directing traffic to a service device is described in greater detail with respect to FIG. 6, below. As another example, when a client device is not trusted, SDN controller 112 may construct a path through the SDN that directs packets associated with the untrusted client device along a path designated for "untrusted" network traffic.

Determining the paths generally includes determining, from a first network device of the SDN, subsequent "next hop" network devices through the SDN. Thus, SDN controller 112 may analyze connections between the network devices (e.g., switches and service devices) and direct traffic from one device to another, assuming that the devices are communicatively coupled and cause the traffic to travel substantially in the direction of the destination of the traffic.

SDN controller 112 may then program the network devices to forward traffic along the determined paths (310). In conventional routers, control plane elements of a router program a forwarding information base (FIB) of a data plane of the router. However, SDN controller 112 represents a control plane element that can program data plane elements (e.g., switches) remotely, that is, without being part of or even directly coupled to the data plane elements. For example, SDN controller 112 may program any or all of network devices 108, 110 and service devices 116 to forward network traffic having particular header data (e.g., source IP address, destination IP address, source port, destination port, protocol, MPLS label(s), VLAN tags, or the like) to a particular next hop (that is, next network device). Moreover, in accordance with the techniques of this disclosure, SDN controller 112 may program network devices of an SDN to forward traffic according to network paths that were determined based on one or more of connections determined between the network devices, service devices among the network devices, zones for packet flows through the network devices, and/or trusted or untrusted packet flows.

After programming the network devices of the SDN, SDN controller 112 may monitor the network devices (312), e.g., to determine whether the network devices are performing according to the programming and determined paths. As one example, SDN controller 112 may inject test traffic into the SDN to determine whether the network devices are forwarding data of a packet flow according to a programmed path (e.g., as explained in greater detail with respect to FIG. 7, below). In some cases, SDN controller 112 may reprogram network devices that are not forwarding data correctly, that is, that are operating improperly (314), assuming such devices can be reprogrammed. In addition, or in the alternative, SDN controller 112 may generate a report indicative of network devices that are operating properly or improperly, reprogram other devices to direct traffic around a malfunctioning device, send an alert to an administrator indicative of the malfunctioning device, direct devices to send traffic that would otherwise be sent through the malfunctioning device along a backup path, update a data model to indicate that a device is malfunctioning, or take other such actions. Utilizing a backup path for a primary path is described in greater detail with respect to FIG. 8, below.

In this manner, the method of FIG. 5 represents an example of a method including determining, by a controller device for a software defined network, connections between network devices in the software defined network, determining, by the controller device, one or more paths for network traffic between the network devices based on the determination of the connections, and programming, by the controller device, the network devices to direct network traffic along the one or more paths.

The method of FIG. 5 also represents an example of a method including obtaining, by a controller device of a software defined network (SDN), data representative of physical network devices in the SDN, wherein the physical network devices comprise one or more switches and one or more controllers including the controller device, instantiating, by the controller device, software-based controller objects for each of the one or more controllers, wherein the software-based controller objects each comprise data representative of a respective instance name, a respective server hostname, and a respective server host port, instantiating, by the controller device, software-based switch description objects for each of the one or more switches, wherein the software-based switch description objects each comprise data representative of a respective primary controller corresponding to a controller of the one or more controllers, a respective switch identifier, a respective switch media access control (MAC) address, a respective Internet protocol (IP) address, and a respective array of port description objects for each physical port on the respective switch, and managing, by the controller device, at least some of the switches using the switch description objects and the controller objects.

Figure 6:
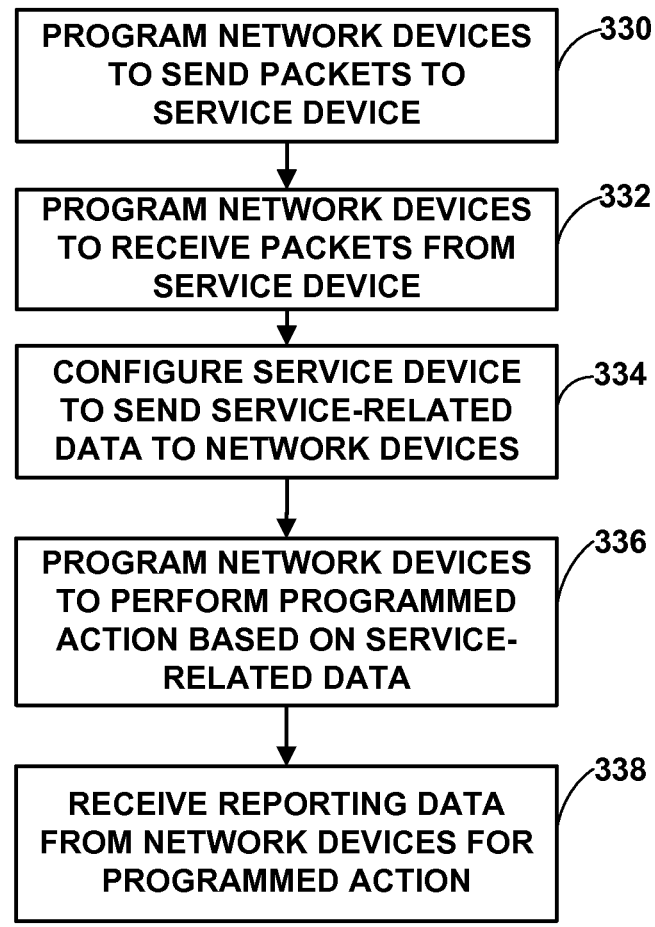
FIG. 6 is a flowchart illustrating an example method for directing network traffic of an SDN to a service device.

FIG. 6 is a flowchart illustrating an example method for directing network traffic of an SDN to a service device. The method of FIG. 6 may be performed by an SDN controller, such as SDN controller 112 (FIGS. 1 and 2) or SDN controller 218 (FIG. 3). Likewise, the method of FIG. 6 may be performed by flow management server 256 and/or SDN controller 270, alone or in combination. For purposes of explanation, the method of FIG. 6 is primarily described with respect to SDN controller 112, although it should be understood that other devices, such as those mentioned above, may be configured to perform the method of FIG. 6.

Initially, SDN controller 112 may program network devices to send packets to a service device (330), e.g., in accordance with the method of FIG. 5. The service device may comprise one of service devices 116. The service device may be any device that can transform the flows of packets and perform appropriate functions on them. Typically, service devices operate at OSI layers four to seven (Layers 4-7), but might operate at other layers. For example, the service device may be one of a distributed denial of service (DDoS) service device, a malware detection system, an intrusion detection service (IDS) device, an intrusion prevention service (IPS) device, a network anti-virus device, a network packet capture and analysis device, a honeypot device, a reflector device, a tar pit device, a domain name service (DNS) device, a web proxy device, a mail proxy device, and an anti-spam device.

In addition, SDN controller 112 may program network devices to receive packets from the service device (332). More particularly, programming the network devices may include programming network devices to receive packets from a service device and forward the packets along the path that was determined for the packet flow corresponding to the packets. In some instances, the network device that forwards a packet to a service device may be the same network device that receives the packet from the service device. In such instances, SDN controller 112 may program a forwarding information base (FIB) of the network device such that the network device analyzes not only a packet header of the packet to determine a next hop for the packet, but also an input interface (e.g., an input port) by which the packet is received. That is, the FIB may include a forwarding table that includes data defining a correspondence from packet header information and an input interface to an output interface, for a packet flow.

In addition, SDN controller 112 may configure the service device to send service-related data to one or more network devices (334). The service-related data may cause the network devices to change a path along which the packet is forwarded. For example, when the service device is a security device (e.g., a firewall or an IDS), if the security device determines that one or more packets of a packet flow are malicious, the security device may send service data indicating that the packet flow includes malicious data. SDN controller 112 may program the network devices of the SDN to perform a programmed action based on the service-related data (336). For example, SDN controller 112 may program network devices to, in response to an indication that packets of a packet flow include malicious data, forward packets of the packet flow to a destination of the packet flow, forward packets of malicious packet flows to a collection device for further analysis, cause network devices to drop packets of the malicious packet flows, send a close session message to devices from which packets of the malicious packet flows were received, block the packets of the packet flow, mirror copies of the packets of the packet flow to a second service device while forwarding the packets of the packet flow to the destination of the packet flow, redirect the packets of the packet flow to a third service device, transform one or more values of headers of the packets, and/or encapsulate the packets with a particular header, or other such actions.

Moreover, SDN controller 112 may configure the service devices to send the service-related data to SDN controller 112 and program the network devices of the SDN to send reporting data to SDN controller 112 indicative of the programmed action that was performed. Thus, when one of the network devices performs a particular programmed action in response to service-related data, SDN controller 112 may receive reporting data from the network device indicative of the programmed action (338). SDN controller 112 may generate a report for a user that consolidates this data in a human-readable format.

In this manner, the method of FIG. 6 represents an example of a method including programming, by a controller device for a software defined network (SDN), a first network device of the SDN to send packets of a packet flow to a service device, and programming, by the controller device, one or more network devices of the SDN to perform a programmed action on packets of the packet flow based on data received from the service device for the packet flow.

Figure 7:
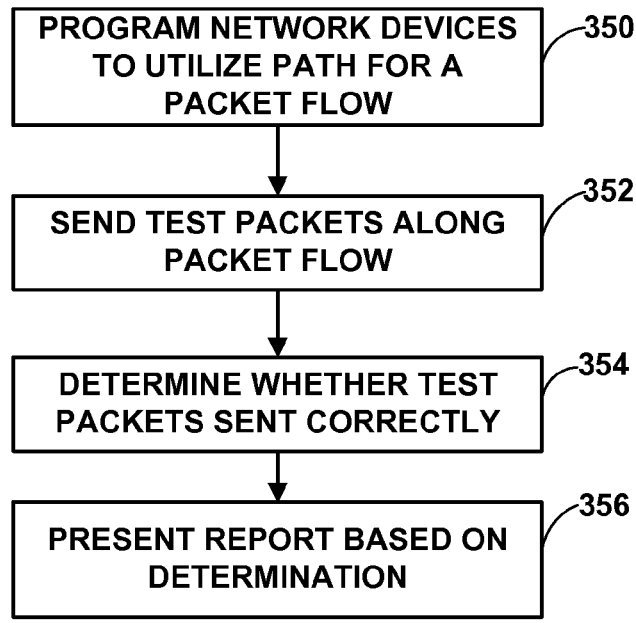
FIG. 7 is a flowchart illustrating an example method for using test traffic to determine whether an SDN packet flow is operating correctly.

FIG. 7 is a flowchart illustrating an example method for using test traffic to determine whether an SDN packet flow is operating correctly. The method of FIG. 7 may be performed by an SDN controller, such as SDN controller 112 (FIGS. 1 and 2) or SDN controller 218 (FIG. 3). Likewise, the method of FIG. 7 may be performed by flow management server 256 and/or SDN controller 270, alone or in combination. For purposes of explanation, the method of FIG. 7 is primarily described with respect to SDN controller 112, although it should be understood that other devices, such as those mentioned above, may be configured to perform the method of FIG. 7.

Initially, SDN controller 112 may program network devices of an SDN to utilize a path through the SDN for a particular packet flow (350). SDN controller 112 may program the network devices as described with respect to FIG. 5 above. SDN controller 112 may then send test packets along the packet flow (352). For example, SDN controller 112 may temporarily program network devices along the path for the packet flow with a rule that causes the network devices to forward packets of the packet flow as usual, and to send an acknowledgement of receipt of the packet to SDN controller 112. In some examples, SDN controller 112 programs a last network device along the path to forward packets of the packet flow being tested to a collection device, which may be a service device within the SDN. SDN controller 112 may then send a test packet of the packet flow to a first network device along the path for the packet flow.

SDN controller 112 then determines whether the test packets are sent correctly (354), e.g., by monitoring acknowledgements from the network devices of the SDN along the path for the packet flow. When a device along the path does not acknowledge receipt of the test packets within a particular amount of time, SDN controller 112 may determine that the device, or a previous device, is not functioning correctly. On the other hand, SDN controller 112 may determine that all devices are functioning correctly (and, hence, that the test packet was sent correctly) when all devices acknowledge receipt of the test packet. SDN controller 112 may then present a report based on the determination of whether the test packet was sent correctly (356). In addition, SDN controller 112 may reprogram the network devices of the SDN to avoid malfunctioning network devices.

In this manner, the method of FIG. 7 represents an example of a method including programming, by a controller device for a software defined network (SDN), a set of network devices of the SDN to form a path through the SDN and to send data representative of packets sent along the path to the controller device, sending, by the controller device, packets of a packet flow corresponding to the path to one of the set of network devices, determining, by the controller device, whether the set of network devices is properly forwarding the packets of the packet flow along the path based on data received from the set of network devices, and presenting a report representative of the determination.

Figure 8:
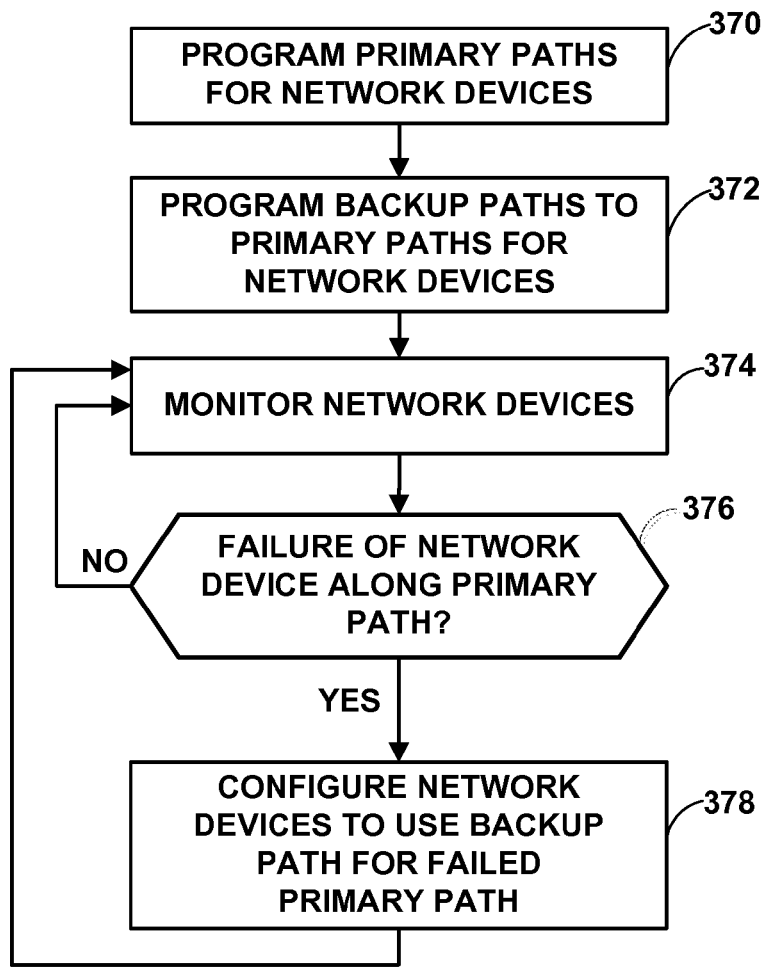
FIG. 8 is a flowchart illustrating an example method for using one or more backup paths to a primary path through an SDN.

FIG. 8 is a flowchart illustrating an example method for using one or more backup paths to a primary path through an SDN. The method of FIG. 8 may be performed by an SDN controller, such as SDN controller 112 (FIGS. 1 and 2) or SDN controller 218 (FIG. 3). Likewise, the method of FIG. 8 may be performed by flow management server 256 and/or SDN controller 270, alone or in combination. For purposes of explanation, the method of FIG. 8 is primarily described with respect to SDN controller 112, although it should be understood that other devices, such as those mentioned above, may be configured to perform the method of FIG. 8.

Initially, SDN controller 112 may program primary paths for network devices (370). Likewise, SDN controller 112 may program one or more backup paths to the primary paths for the network devices (372). SDN controller 112 may be configured with one or more strategies for determining the backup paths. In general, the primary path corresponds to a sequence of connected devices, such that device N along the path is communicatively coupled to device N+1 of the path. In one example, SDN controller 112 may determine a backup path that avoids all of the devices of the primary path. In other words, the intersection of the set of devices forming the primary path and the set of devices forming the backup path yields the empty set. In another example, SDN controller 112 may determine a backup path that includes at least some of the devices of the primary path, but omits one or more of the devices of the primary path. In such an example, SDN controller 112 may determine a plurality of backup paths to the primary path, each of the backup paths omitting one or more different devices of the primary path than the other backup paths. Thus, the backup paths may include devices that are not included along the primary path. Programming the network devices may be performed in a manner substantially similar to the method described with respect to FIG. 5.

In general, programming the primary path and the backup path(s) may be achieved by programming the network devices to direct traffic along the primary path and, in the event of a failure of a device along the primary path, to direct traffic along a backup path. In some examples, SDN controller 112 monitors the network devices (374) to determine whether such a failure has occurred. In other examples, SDN controller 112 may program a service device to monitor the network devices to determine whether such a failure has occurred. The service device may comprise a physical service device, a multi-tenant service device, or a virtual service device, as explained above. In either case, SDN controller 112 may program the network devices to periodically send data to the monitoring device (e.g., SDN controller 112 or a service device), so that the monitoring device is able to determine whether one of the network devices along the primary path has failed (376).

In the event that there has not been a failure of a network device along the primary path ("NO" branch of 376), the monitoring device may continue to monitor the network devices (374). On the other hand, in the event that there has been a failure of a network device along the primary path ("YES" branch of 376), SDN controller 112 (or a service device acting as the monitoring device) may configure the network devices to use the backup path for the failed primary path (378). In effect, this causes the backup path to become the primary path, and therefore, the monitoring device may then continue to monitor the network devices along the new primary path (i.e., the backup path to the original, failed primary path) (374).

In some examples, the network devices may be pre-programmed with the primary path and the backup paths, as shown in FIG. 8. In other examples, SDN controller 112 may program the network devices to forward traffic along the primary path, and in response to a failure of a network device along the primary path, to forward traffic along the backup path.

In this manner, the method of FIG. 8 represents an example of a method including determining, by a controller device for a software defined network (SDN), a primary path for network traffic between network devices of the SDN, determining, by the controller device, a backup path to the primary path for the network traffic between the network devices of the SDN, and, in response to a failover event, programming the network devices to switch from the primary path to the backup path.

Figure 9:
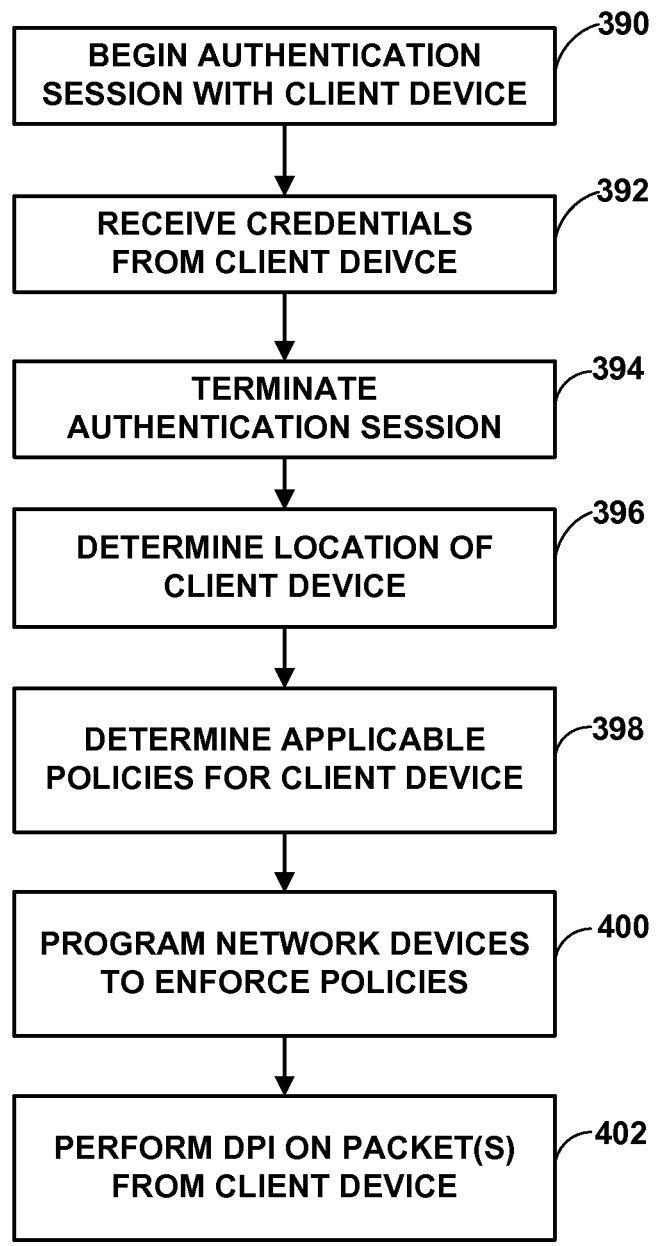
FIG. 9 is a flowchart illustrating an example method for performing authentication and authorization techniques described herein.

FIG. 9 is a flowchart illustrating an example method for performing authentication and authorization for a client device that is attempting to communicate with an SDN. The method of FIG. 9 may be performed by an SDN controller, such as SDN controller 112 (FIGS. 1 and 2) or SDN controller 218 (FIG. 3). Likewise, the method of FIG. 9 may be performed by flow management server 256 and/or SDN controller 270, alone or in combination. For purposes of explanation, the method of FIG. 9 is primarily described with respect to SDN controller 112, although it should be understood that other devices, such as those mentioned above, may be configured to perform the method of FIG. 9.

As discussed above, SDN controller 112 may be configured to utilize a public key infrastructure (PKI)-based protocol, such as 802.1X, to authenticate and/or authorize a client device, e.g., client device 102. However, rather than using this 802.1X session to enforce policies, SDN controller 112 may be configured to program network devices of the SDN to enforce the policies. Thus, initially, SDN controller 112 may begin an authentication session with a client device (390), e.g., client device 102. During the authentication session, SDN controller 112 may receive authentication credentials from client device 102 (392). The credentials may be in accordance with the Lightweight Directory Access Protocol (LDAP), Microsoft Active Directory, a public key certificate in accordance with PKI, or the like. After authenticating client device 102, SDN controller 112 may terminate the authentication session (394).

SDN controller 112 may determine a geographic location of client device 102 (396). SDN controller 112 may determine the geographic location using any of a variety of possible mechanisms, such as global position system (GPS) information (assuming client device 102 is a mobile device), domain name service (DNS) information, an Internet protocol (IP) address of client device 102, and/or other such information. The policies may correspond to fine-grain policies that are applied on a per-packet-flow basis, and may be based on any or all of a user identity, a client device identity, an application being executed by the client device, and/or the geographic location of client device 102. Thus, SDN controller 112 may determine applicable policies for client device 112 (398), e.g., based on any or all of the user identity, the client device identity, the application, and the geographic location of client device 102.

SDN controller 112 may then program network devices of the SDN to enforce the policies (400). For example, SDN controller 112 may program the network devices to direct packet flows including client device 102 along various paths, depending on the applicable policies for the packet flows. That is, certain packet flows originating from client device 102 or destined for client device 102 may be forwarded along different paths than other packet flows originating from or destined for client device 102, based on, e.g., the user of client device 102, an application, corresponding to the packet flow, that is being executed by client device 102, and/or a geographic location of client device 102. Likewise, packet flows for the same user using client device 102 and the same application may be directed along different paths through SDN 106 based on the geographic location of client device 102. Again, the policies may correspond to any combination of these factors, and may include additional or alternative factors in other examples.

In some examples, SDN controller 112 further performs deep packet inspection (DPI) on packets from client device 102 (402). For example, SDN controller 112 may inspect one or more preliminary packets of packet flows originating from or directed to client device 102, and after determining that the packet flows are not malicious (after a predetermined number of packets), stop inspecting the packet flows. Alternatively, SDN controller 112 may program network devices of SDN 106 to forward a predetermined number of packets of the packet flows originating from or destined for client device 102 through a deep packet inspection service device, which may correspond to one of service devices 116.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
obtaining, by a controller device of a software defined network (SDN), data representative of physical network devices in the SDN, wherein the physical network devices comprise one or more switches and one or more controllers including the controller device to build a network topology of the overall SDN network and connected physical devices;

instantiating, by the controller device, software-based controller objects for each of the one or more controllers, wherein the software-based controller objects each comprise data representative of a respective instance name, a respective server hostname, and a respective server host port to provide connectivity to each controlled object;

instantiating, by the controller device, software-based switch description objects for each of the one or more switches using a unique data model to effect port-based and header-based flow-controls for data packets traversing the one or more switches, wherein the software-based switch description objects each comprise data representative of a respective primary controller corresponding to a controller of the one or more controllers, a respective switch identifier, a respective switch media access control (MAC) address, a respective Internet protocol (IP) address, and a respective array of port description objects for each physical port on the respective switch; and managing, by the controller device, at least some of the switches using the switch description objects and the controller objects to effect port-based and header-based control of flows for packets traversing the network topology.

2. The method of claim 1, wherein each of the port description objects comprises data representative of a respective port number, a respective port identifier, a MAC address, and a description of one or more capabilities for the respective port.

3. The method of claim 2, wherein the one or more capabilities comprise one or more of a media type for the respective port, a speed for the respective port, whether the respective port is half duplex or full duplex, and whether the port supports auto-negotiation.

4. The method of claim 1, further comprising:
determining changes to the SDN; and
logging the changes to the SDN in an event history.

5. The method of claim 4, wherein logging the changes comprises, for each change, logging data for an event record for an event causing the change, wherein the event record comprises a time of the event, a date of the event, a type for the event, a source for the event, a severity of the event, and a description of the event.

6. The method of claim 5, wherein logging data for the event record comprises logging a list of one or more values for arguments for the event.

7. The method of claim 1, wherein managing comprises defining a set of configuration data for managing a packet flow through the SDN that provides a data model supporting the instantiation of software FlowChain objects through the network topology.

8. The method of claim 7, wherein defining the set of configuration data comprises instantiating a software FlowChain object comprising data for an identifier, a source, one or more links between the switches for the packet flow, a flag indicating whether the FlowChain object is enabled, a flag indicating whether a path through the SDN corresponding to the FlowChain object is bi-directional, and a set of statistics.

9. The method of claim 8, wherein instantiating the software FlowChain object further comprises instantiating one or more software FlowLink objects that define respective software sub-device objects, wherein the software sub-device objects define a respective subset of network device functions for multi-function devices, and wherein the software sub-device objects comprise data representative of an identifier for a respective sub-device, an ingress switch identifier and port number, an egress switch identifier and port number, an ingress virtual local area network (VLAN) tag, an egress VLAN tag, a flag that indicates whether the sub-device is capable of performing network address translation (NAT), a flag that indicates whether the sub-device is capable of performing port address translation (PAT), and identifiers for physical ports of the sub-device.

10. The method of claim 1, further comprising instantiating a software service object that defines a class of traffic that flows through the SDN, wherein the service object comprises data representing an identifier for the service, a protocol type for the service, and one or more IP port-based service entries that define traffic controlled by the flow.

11. A controller device for a software defined network (SDN), the controller device comprising:
one or more network interfaces configured to communicate with network devices of the SDN; and
one or more processors configured to obtain data representative of the network devices in the SDN, wherein the network devices comprise one or more switches and one or more controllers including the controller device to build a network topology of the overall SDN network and connected physical devices, instantiate software-based controller objects for each of the one or more controllers, wherein the software-based controller objects each comprise data representative of a respective instance name, a respective server hostname, and a respective server host port to provide connectivity to each controlled object, instantiate software-based switch description objects for each of the one or more switches using a unique data model to effect port-based and header-based flow-controls for data packets traversing the one or more switches, wherein the software-based switch description objects each comprise data representative of a respective primary controller corresponding to a controller of the one or more controllers, a respective switch identifier, a respective switch media access control (MAC) address, a respective Internet protocol (IP) address, and a respective array of port description objects for each physical port on the respective switch, and manage, via the network interfaces, at least some of the switches using the switch description objects and the controller objects to effect port-based and header-based control of flows for packets traversing the network topology.

12. The controller device of claim 11, wherein each of the port description objects comprises data representative of a respective port number, a respective port identifier, a MAC address, and a description of one or more capabilities for the respective port, and wherein the one or more capabilities comprise one or more of a media type for the respective port, a speed for the respective port, whether the respective port is half duplex or full duplex, and whether the port supports auto-negotiation.

13. The controller device of claim 11, wherein the one or more processors are further configured to determine changes to the SDN, and log the changes to the SDN in an event history, wherein for each change, the one or more processors are configured to log data for an event record for an event causing the change, wherein the event record comprises one or more of a time of the event, a date of the event, a type for the event, a source for the event, a severity of the event, and a description of the event.

14. The controller device of claim 11, wherein the one or more processors are configured to instantiate a software FlowChain object comprising data for an identifier, a source, one or more links between the switches for the packet flow, a flag indicating whether the FlowChain object is enabled, a flag indicating whether a path through the SDN corresponding to the FlowChain object is bi-directional, and a set of statistics.

15. The controller device of claim 11, wherein the one or more processors are configured to instantiate a software service object that defines a class of traffic that flows through the SDN, wherein the service object comprises data representing an identifier for the service, a protocol type for the service, and one or more IP port-based service entries that define traffic controlled by the flow.

16. A non-transitory computer-readable storage medium having stored thereon instructions that, when executed, cause a processor of a controller device for a software defined network (SDN) to:
obtain data representative of physical network devices in the SDN, wherein the physical network devices comprise one or more switches and one or more controllers including the controller device to build a network topology of the overall SDN network and connected physical devices;

instantiate software-based controller objects for each of the one or more controllers, wherein the software-based controller objects each comprise data representative of a respective instance name, a respective server hostname, and a respective server host port to provide connectivity to each controlled object;

instantiate software-based switch description objects for each of the one or more switches using a unique data model to effect port-based and header-based flow-controls for data packets traversing the one or more switches, wherein the software-based switch description objects each comprise data representative of a respective primary controller corresponding to a controller of the one or more controllers, a respective switch identifier, a respective switch media access control (MAC) address, a respective Internet protocol (IP) address, and a respective array of port description objects for each physical port on the respective switch; and manage at least some of the switches using the switch description objects and the controller objects via issuing instructions to the switches using an appropriate protocol to drive the data packets through the network topology.

17. The non-transitory computer-readable storage medium of claim 16, wherein each of the port description objects comprises data representative of a respective port number, a respective port identifier, a MAC address, and a description of one or more capabilities for the respective port, and wherein the one or more capabilities comprise one or more of a media type for the respective port, a speed for the respective port, whether the respective port is half duplex or full duplex, and whether the port supports auto-negotiation.

18. The non-transitory computer-readable storage medium of claim 16, further comprising instructions that cause the processor to:
determine changes to the SDN; and
log the changes to the SDN in an event history, wherein for each change, instructions cause the processor to log data for an event record for an event causing the change, wherein the event record comprises one or more of a time of the event, a date of the event, a type for the event, a source for the event, a severity of the event, and a description of the event.

19. The non-transitory computer-readable storage medium of claim 16, wherein the instructions that cause the processor to define the set of configuration data comprise instructions that cause the processor to instantiate a software FlowChain object comprising data for an identifier, a source, one or more links between the switches for the packet flow, a flag indicating whether the FlowChain object is enabled, a flag indicating whether a path through the SDN corresponding to the FlowChain object is bi-directional, and a set of statistics.

20. The non-transitory computer-readable storage medium of claim 16, further comprising instructions that cause the processor to instantiate a software service object that defines a class of traffic that flows through the SDN, wherein the service object comprises data representing an identifier for the service, a protocol type for the service, and one or more IP port-based service entries that define traffic controlled by the flow.

* * * * *